(12) United States Patent
Matoba

(10) Patent No.: US 11,876,860 B2
(45) Date of Patent: Jan. 16, 2024

(54) DATA SHARING SYSTEM, DATA SHARING METHOD AND NON-TRANSITORY COMPUTER-READABLE RECORDING MEDIUM FOR DATA SHARING PROGRAM

(71) Applicant: Hitachi, Ltd., Tokyo (JP)

(72) Inventor: Hiroshi Matoba, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/900,715

(22) Filed: Aug. 31, 2022

(65) Prior Publication Data

US 2023/0403324 A1 Dec. 14, 2023

(30) Foreign Application Priority Data

May 26, 2022 (JP) .................. 2022-086046

(51) Int. Cl.
*H04L 67/1097* (2022.01)
*H04L 43/04* (2022.01)

(52) U.S. Cl.
CPC .......... *H04L 67/1097* (2013.01); *H04L 43/04* (2013.01)

(58) Field of Classification Search
CPC ............................. H04L 67/1097; H04L 43/04
See application file for complete search history.

(56) References Cited

U.S. PATENT DOCUMENTS

| | | | | |
|---|---|---|---|---|
| 9,325,790 B1* | 4/2016 | Le | ........................... | H04L 67/10 |
| 10,802,847 B1* | 10/2020 | Mahapatra | .......... | G06F 11/0793 |
| 11,409,771 B1* | 8/2022 | Goyal | ................. | G06F 16/2228 |
| 2012/0101952 A1* | 4/2012 | Raleigh | ............... | H04L 12/1417 |
| | | | | 709/223 |
| 2013/0117473 A1* | 5/2013 | Hyo | ..................... | G06F 11/3048 |
| | | | | 710/18 |
| 2013/0246568 A1* | 9/2013 | Chesterfield | ........ | H04L 67/1097 |
| | | | | 709/217 |
| 2014/0307758 A1* | 10/2014 | Kase | ..................... | H02H 7/263 |
| | | | | 375/211 |
| 2015/0081785 A1* | 3/2015 | Angelsmark | ........... | G06F 9/542 |
| | | | | 709/204 |

(Continued)

FOREIGN PATENT DOCUMENTS

CN    105188081 A  * 12/2015
CN    113641301 A  * 11/2021

(Continued)

*Primary Examiner* — Shean Tokuta
(74) *Attorney, Agent, or Firm* — Procopio, Cory, Hargreaves & Savitch LLP

(57) ABSTRACT

In a data sharing system 1, a plurality of dHCI systems 100 share data by communication, and each of the plurality of dHCI systems 100 is configured to include a dHCI 110 to provide a virtual environment to execute an application and a storage system 120 to provide a volume to the virtual environment together with a storage device of the dHCI 110. Each of the plurality of dHCI systems 100 stores data of the own computer system in the volume of the own computer system and acquires data of another computer system from the other computer system and stores the data in the volume. When data of some other computer system cannot be acquired from the other computer system, each of the plurality of dHCI systems 100 acquires the data from a different other computer system and stores the data in the volume.

13 Claims, 20 Drawing Sheets

(56) References Cited

U.S. PATENT DOCUMENTS

| | | | | |
|---|---|---|---|---|
| 2015/0304371 A1* | 10/2015 | Fujita | .................... | H04L 65/403 |
| | | | | 709/204 |
| 2017/0195866 A1* | 7/2017 | Kim | ...................... | H04W 12/08 |
| 2017/0289901 A1* | 10/2017 | Kim | ........................ | G06Q 50/00 |
| 2017/0344313 A1* | 11/2017 | Hayasaka | ................. | G06F 3/08 |
| 2017/0347222 A1* | 11/2017 | Kanter | ................... | H04L 67/02 |
| 2019/0036815 A1* | 1/2019 | Kancherla | ............... | H04L 67/10 |
| 2019/0289648 A1* | 9/2019 | Kim | ........................ | H04W 8/26 |
| 2020/0274923 A1* | 8/2020 | Jujjuri | ................. | G06F 11/3433 |
| 2021/0334178 A1* | 10/2021 | Yang | .................. | G06F 11/3495 |
| 2023/0030816 A1* | 2/2023 | Bursell | ................... | G06F 21/57 |

FOREIGN PATENT DOCUMENTS

| | | | | |
|---|---|---|---|---|
| JP | 2006222800 | A | * | 8/2006 |
| JP | 4126246 | B2 | * | 7/2008 |
| JP | 2013135643 | A | * | 7/2013 |
| WO | 2017094168 | A1 | | 6/2017 |

* cited by examiner

FIG. 5

JOINT OTHER BASE INFORMATION TABLE

T1

| BASE | IP/host | AUTHENTICATION INFORMATION |
|---|---|---|
| B | 192.168.100.1 | AAAAA |
| C | 192.168.100.2 | BBBBB |
| ... | | |

FIG. 6

OTHER BASE COMMUNICATION CONTAINER INFORMATION TABLE

T2

| CONTAINER | COMMUNICATION DESTINATION BASE | MOUNT PV | PRIORITY |
|---|---|---|---|
| CONTAINER-1 | B | BACK-END PV (BASE B) | 0 |
| CONTAINER-2 | C | BACK-END PV (BASE C) | 0 |
| CONTAINER-3 | C | BACK-END PV (BASE B) | 1 |
| ... | | | |

FIG. 7

RETENTION PERIOD INFORMATION TABLE

T3

| TARGET DATA | RETENTION PERIOD |
|---|---|
| global | 1h |
| ... | |

FIG. 8

CONTAINER LIFETIME INFORMATION TABLE

T4

| CONTAINER | LIFETIME |
|---|---|
| CONTAINER-1 | 0 |
| CONTAINER-2 | 0 |
| CONTAINER-3 | 2h |
| ... | | ical computer, in which each of the plurality of com-
DATA SHARING SYSTEM, DATA SHARING METHOD AND NON-TRANSITORY COMPUTER-READABLE RECORDING MEDIUM FOR DATA SHARING PROGRAM

CROSS REFERENCES TO RELATED APPLICATION

This application claims priority based on Japanese patent applications, No. 2022-086046 filed on May 26, 2022, the entire contents of which are incorporated herein by reference.

BACKGROUND

The present invention relates to a data sharing system, a data sharing method and a non-transitory computer-readable recording medium for a data sharing program.

For example, WO2017/094168 discloses a mutual monitoring system including a core that stores a plurality of edges and fault information of all the edges as a system in which the fault information of each edge is shared among the plurality of edges. Each of the plurality of edges includes "a fault information retaining section that can retain other fault information based on performance histories of the other edges together with own fault information based on a performance history of the own edge, an own fault information notifying section that notifies the core of the own fault information relating to the own edge in the fault information retaining section, and updates and reflects all the fault information based on the own fault information, and another fault information acquisition section that updates the other fault information retained in the fault information retaining section using the other fault information acquired from all the fault information when the other fault information relating to other edges of all the fault information in a fault information management section on the core side is newer than the other fault information retained."

In recent years, a virtualized infrastructure called a "dHCI" (disaggregated hyper converged infrastructure) that treats a system in which a server and a storage are constructed of different hardware as if they were one HCI has been coming up.

Here, in the dHCI system, each function including certification and authorization or the like operates for each dHCI system independently, and so monitoring setting and acquisition of operation information are performed for each dHCI system individually. That is, when data such as fault information retained by each dHCI system is shared among a plurality of dHCI systems, the data is acquired for each dHCI system individually. The same applies to any one of a case where a plurality of dHCI systems are operated within one base and a case where the dHCI system is operated at a plurality of bases. Thus, an administrative burden on a system administrator increases.

An object of the present invention, which has been made in view of the above-described problem, is to provide a data sharing system, a data sharing method and a data sharing program for reducing an administrative burden on a system administrator who manages a plurality of dHCI systems.

SUMMARY

In order to solve the above-described problem, an aspect of the present invention is a data sharing system in which a plurality of computer systems share data by communication, each computer system being configured to include a physical computer that provides a virtual environment to execute an application and a storage system that provides a volume to the virtual environment together with a storage device of the physical computer, in which each of the plurality of computer systems stores data of the own computer system in the volume of the own computer system, acquires data of another computer system from the other computer system and stores the data in the volume, and when data of some other computer system cannot be acquired from the other computer system, the data is acquired from a different other computer system and stored in the volume.

According to the present invention, it is possible to reduce the administrative burden on a system administrator who manages a plurality of dHCI systems.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a diagram illustrating a configuration of a coordinated other base information table;

FIG. 6 is a diagram illustrating a configuration of another base communication container information table;

FIG. 7 is a diagram illustrating a configuration of a retention period information table;

FIG. 8 is a diagram illustrating a configuration of a container lifetime information table;

DETAILED DESCRIPTION OF THE PREFERRED EMBODIMENTS

Figure 1:
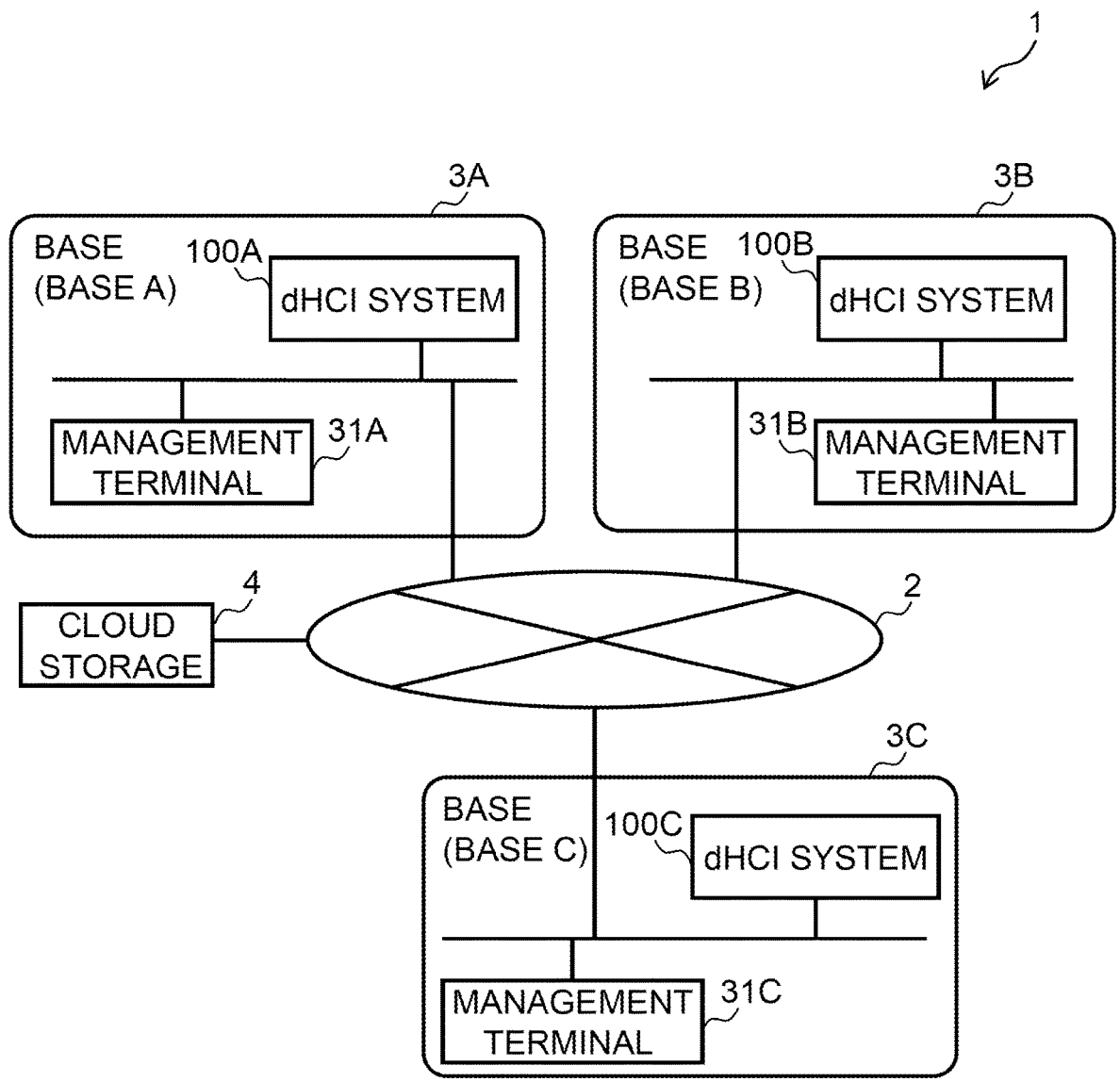
FIG. 1 is a diagram illustrating a configuration of a data sharing system according to an embodiment.

Hereinafter, embodiments of the present invention will be described with reference to the accompanying drawings. The embodiments are examples to illustrate the present invention, and omissions and simplifications are made for clarification of explanation as appropriate. The present invention can also be implemented in various other forms. Each component may be singular or plural unless specified otherwise.

When there are a plurality of components having an identical or similar function, such components may be described with different subscripts attached to the identical reference numerals. If the plurality of these components need not be distinguished from each other, they may be described without subscripts.

In the embodiments, processing carried out by executing a program may be described. Here, the computer performs processing defined in a program by a processor (e.g., CPU (central processing unit), GPU (graphics processing unit)) using a storage resource (e.g., memory), an interface device (e.g., communication port) or the like. For this reason, the entity of processing carried out by executing the program may be the processor. Likewise, the entity of the processing carried out by executing the program may be a controller, an apparatus, a system, a computer or a node having a processor. The entity of the processing carried out by executing the program may be an operation section and may also include a dedicated circuit that carries out specific processing. Here, examples of the dedicated circuit include an FPGA (field programmable gate array), an ASIC (application specific integrated circuit) or a CPLD (complex programmable logic device).

The program may be installed from a program source into the computer. The program source may be non-transitory storage media readable, for example, to a program distribution server or a computer. If the program source is a program distribution server, the program distribution server may include a processor and a storage resource that stores a program to be distributed and the processor of the program distribution server may distribute the program to be distributed to other computers. According to the embodiment, two or more programs may be implemented as one program or one program may be implemented as two or more programs.

In the following embodiments, although various information will be described in a table format, the various information may be presented in a non-table format.

Embodiments (Configuration of Data Sharing System 1 According to Embodiment)

FIG. 1 is a diagram illustrating a configuration of a data sharing system 1 according to an embodiment. The data sharing system 1 includes a dHCI system 100A and a management terminal 31A installed on a base 3A (base A), and a dHCI system 100B and a management terminal 31B installed on a base 3B (base B). The data sharing system 1 also includes a dHCI system 100C and a management terminal 31C installed on a base 3C (base C), and a cloud storage 4. The dHCI system 100, the management terminal 31 and the cloud storage 4 are communicably coupled to one another via a network 2.

An example where one dHCI system 100 is installed on each of the three bases 3A, 3B and 3C will be described in the present embodiment. However, the number of dHCI systems 100 on the base 3 and each base is not limited to this, but the number of bases may be four or more or a plurality of dHCI systems 100 may be installed on each base. The dHCI system 100 is an example of the computer system.

(Configuration of dHCI System 100)

Figure 2:
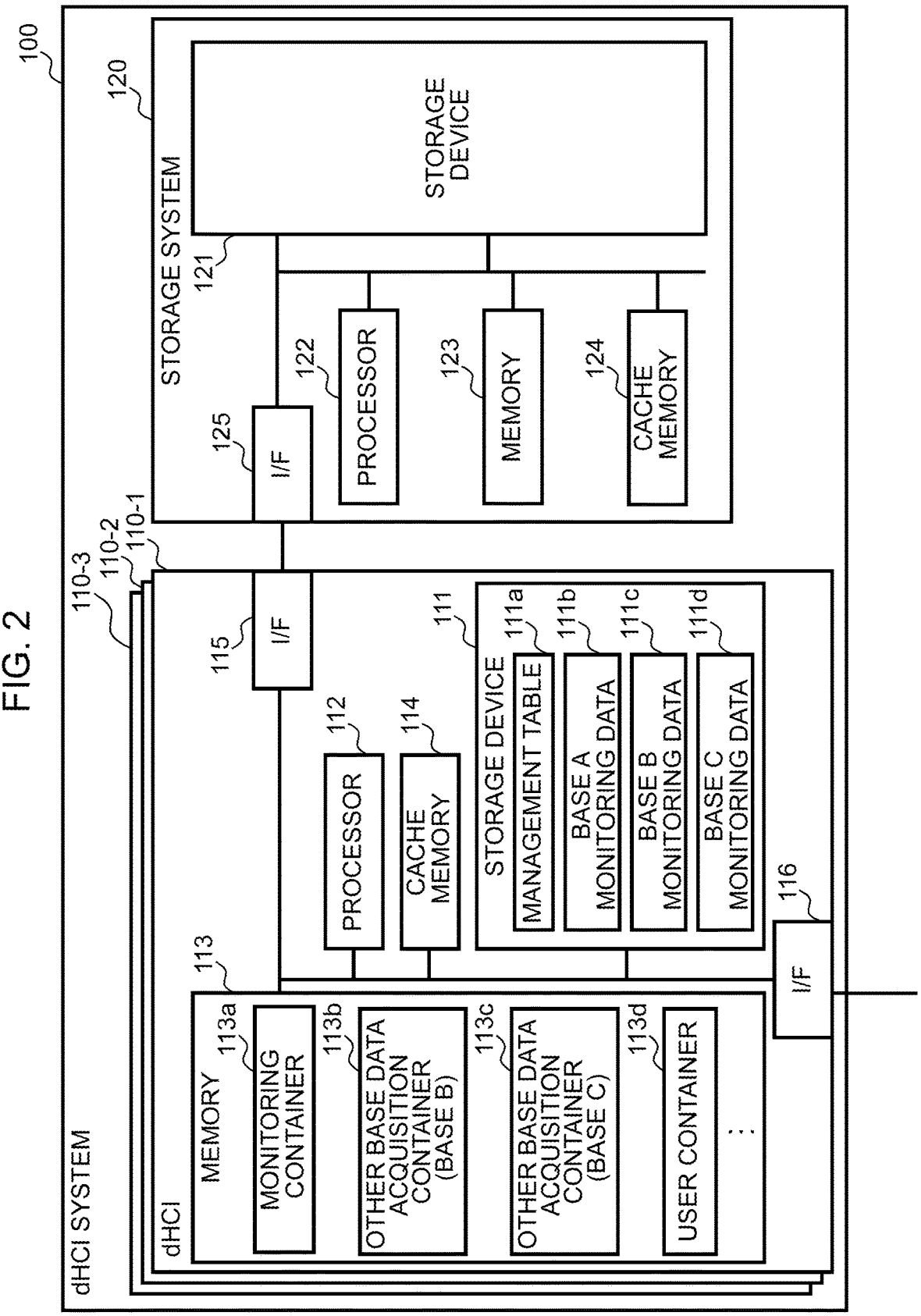
FIG. 2 is a diagram illustrating a configuration of a dHCI system according to the embodiment.

FIG. 2 is a diagram illustrating a configuration of the dHCI system 100 according to the present embodiment. For example, if the dHCI system 100 is a dHCI system 100A installed on the base 3A, the own base is the base 3A and the other bases are the bases 3B and 3C. The following description assumes that the own base is the base 3A and the other bases are the bases 3B and 3C.

The dHCI system 100 includes one or more dHCIs 110 and one or more storage systems 120. The dHCI 110 is a compute node and the storage system 120 is a storage node. In the present embodiment, the dHCI system 100 will be described as having three dHCIs 110-1, 110-2 and 110-3, and one storage system 120. The dHCI 110 is an example of a physical computer (compute node) that provides a virtual environment to execute an application. The storage system 120 is an example of a storage system (storage node) to provide a volume together with a storage device of the physical computer for the virtual environment.

The dHCI 110 is a computer including a storage device 111, a processor 112, a memory 113, a cache memory 114, an I/F (Inter/Face) 115 and an I/F 116. The I/F 115 is a communication apparatus for the dHCI 110 to communicate with the storage system 120. The I/F 116 is a communication apparatus for the dHCI 110 to communicate with the other dHCI 110 of the own base and to communicate with the other dHCI 110 of the other base via the network 2.

Figure 3:
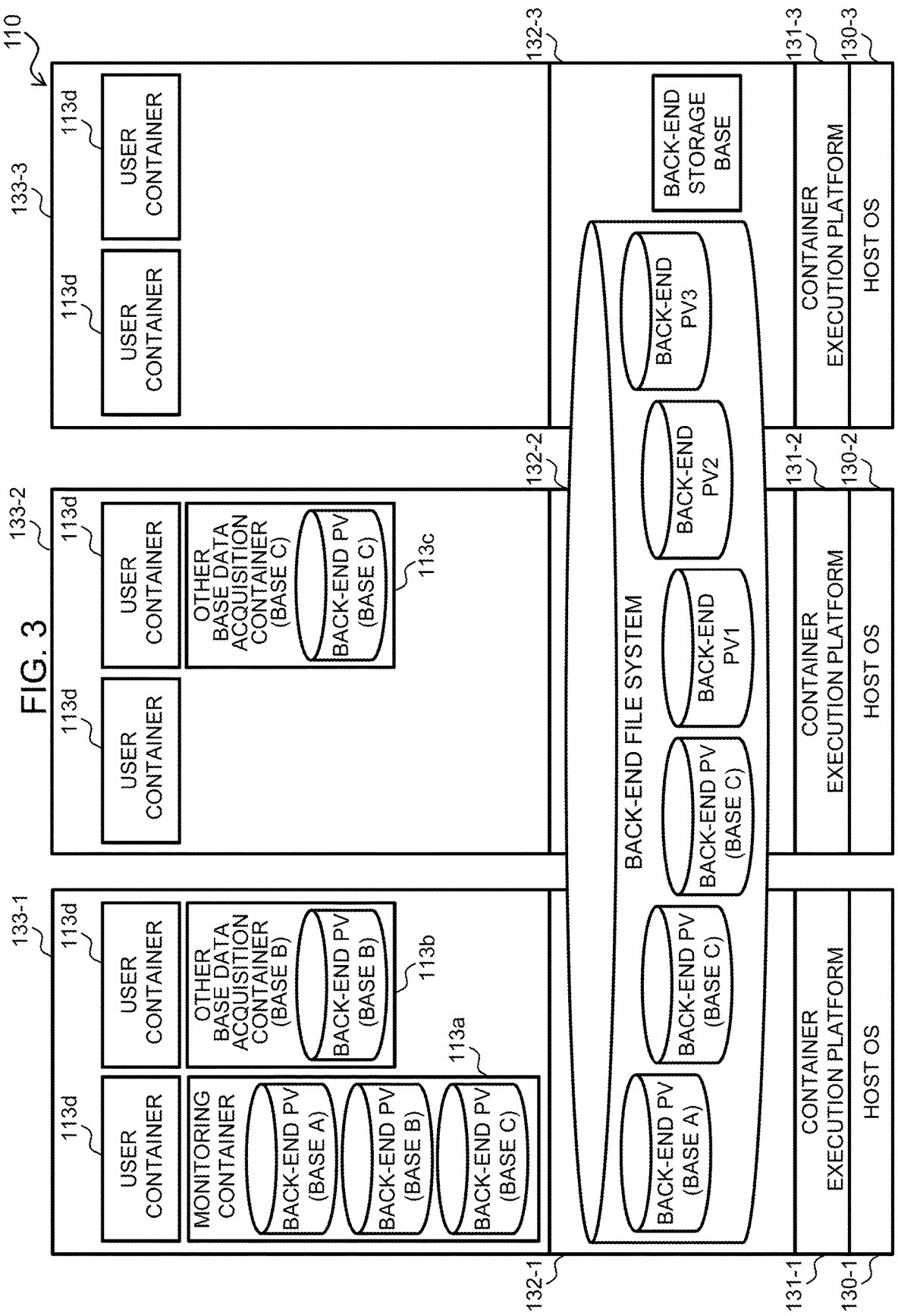
FIG. 3 is a diagram illustrating a software configuration of the dHCI according to the embodiment.

The storage device 111 stores a management table group 111a, base A monitoring data 111b, base B monitoring data 111c, and base C monitoring data 111d. The base A monitoring data 111b is own monitoring data when the base A is the own base. The base B monitoring data 111c and the base C monitoring data 111d are other monitoring data when the base A is the own base. The storage device 111 provides a back-end file system that provides back-end PVs (persistent volumes) together with a storage device 121 of the storage system 120 on back-end storage infrastructures 132-1, 132-2 and 132-3 (FIG. 3).

The processor 112 is a microprocessor such as a CPU. The processor 112 executes a program stored in a non-transitory computer readable recording medium such as the storage device 111 in cooperation with the memory 113 and implements various containers which are deployed in the memory 113. One or more container infrastructures are implemented when one or more dHCIs 110 execute the containers.

Figure 11:
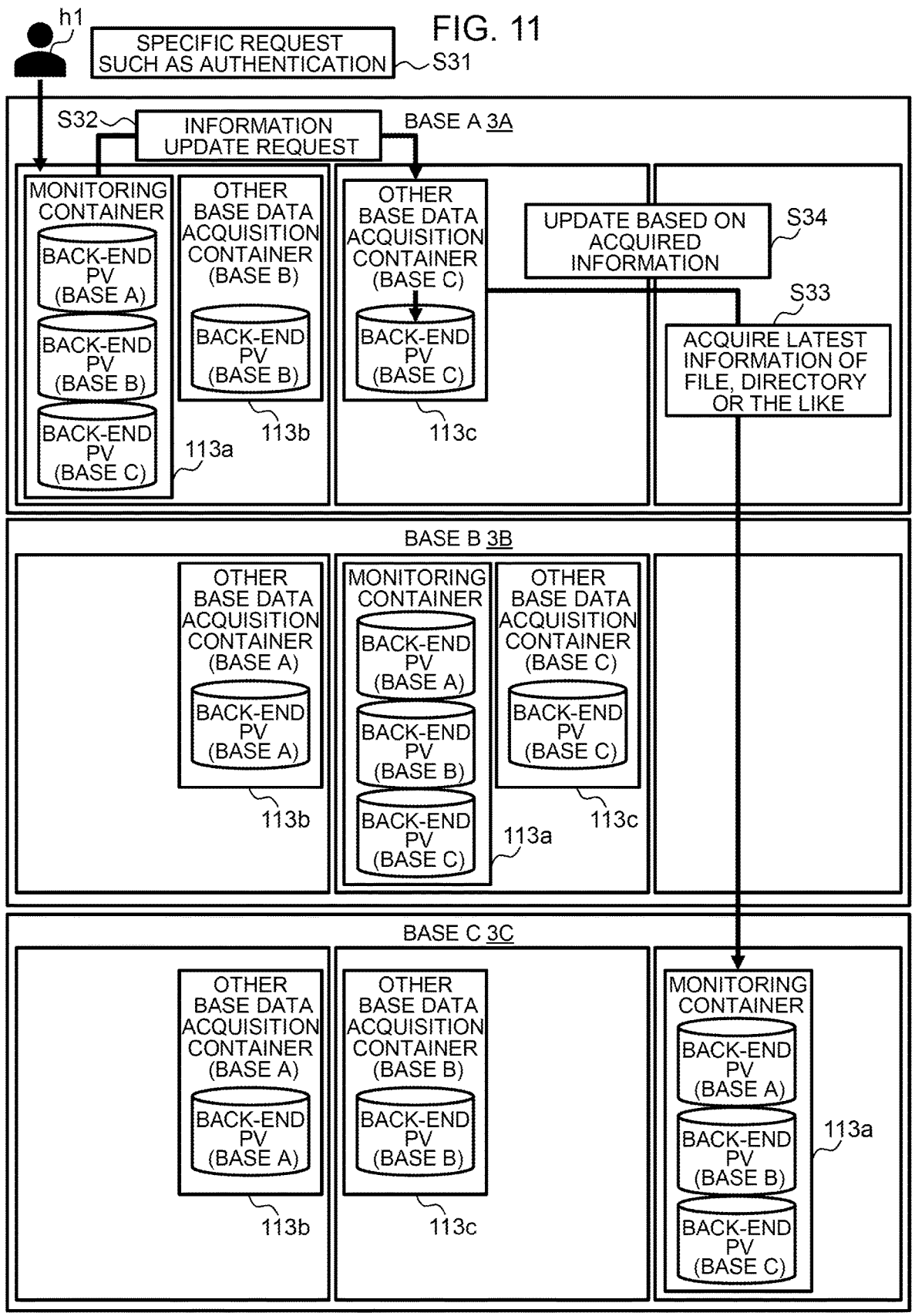
FIG. 11 is a diagram to describe acquisition and reflection (under normal conditions) of file, directory information of the other base at time of administrator authentication or the like according to the embodiment.

The memory 113 stores a monitoring container 113a, another base data acquisition container 113b, another base data acquisition container 113c, and one or more user containers 113d, which are executed by the processor 112. In FIG. 2, since the own base is the base A and the base B and the base C, which are other bases, are communication destinations, they are denoted as the other base data acquisition container (base B) 113b and the other base data acquisition container (base C) 113c. When the own base is the base B, since the base A and the base C, which are the other bases, are communication destinations, they are denoted as the other base data acquisition container (base A) 113b and the other base data acquisition container (base C) 113c (FIG. 11). When the own base is the base C, since the base A and the base B, which are the other bases, are communication destinations, they are denoted as other base data acquisition container (base A) 113b, and the other base data acquisition container (base B) 113c (FIG. 11).

The monitoring container 113a mounts a back-end PV (base A) (FIG. 3), stores and makes reference to the base A monitoring data 111b. The monitoring data is information on monitoring results of operating situations such as use rates of the processor 112, the memory 113 and the storage device 121 of the storage system 120 saved in file formats in the dHCI system 100 of each base 3.

The monitoring container 113a mounts a back-end PV (base B) (FIG. 3) and makes reference to the base B monitoring data 111c. When the base B monitoring data 111c is a stub file, the monitoring container 113a transmits a recall request to the other base data acquisition container (base B) 113b.

Similarly, the monitoring container 113a mounts a back-end PV (base C) (FIG. 3) and makes reference to the base C monitoring data 111d. When the base C monitoring data 111d is a stub file, the monitoring container 113a transmits a recall request to the other base data acquisition container (base C) 113c.

The monitoring container 113a receives a monitoring data acquisition request of the own base (base A) from another base (base B or base C). The monitoring container 113a reads the monitoring data of the base specified by the acquisition request from the back-end PV (base A, base B or base C) and transfers the monitoring data to the other base of the acquisition request transmission source.

Upon fulfillment of predetermined conditions, the monitoring container 113a converts the monitoring data of the other bases stored in the back-end PV (base B) and the back-end PV (base C) to a stub file. The "fulfillment of predetermined conditions" means that the period during which the corresponding data is not accessed after data is stored has excessed a retention period defined in the retention period information table T3 (FIG. 7) or the like.

When the file, directory information or the file of the monitoring data of the other base has not been successfully acquired from the other base due to a communication failure or the like, the monitoring container 113a generates a "different other base data acquisition container." The different other base data acquisition container is a container to acquire the file, directory information or the file of the other base from the different other base.

When generating a "different other base data acquisition container," the monitoring container 113a determines a "different other base" which is a communication destination base in order of entry of bases of a coordinated other base information table T1 (FIG. 5). The monitoring container 113a selects a "communication destination base" and a "container" of the "mount PV" that match the determined "different other base" and the "back-end PV of the other base of the data acquisition target" from the other base communication container information table T2 (FIG. 6). The "container" to be selected is a "container" with highest "priority" among communicable "communication destination bases." When the determined "different other base" and the "communication destination base" and the "container" of the "mount PV" that match the "back-end PV of the other base of the data acquisition target" are not found in the other base communication container information table T2 (FIG. 6), the monitoring container 113a generates a necessary container.

When the generated "different other base data acquisition container" reaches a lifetime defined in the container lifetime information table T4 (FIG. 8), the monitoring container 113a stops and extinguishes the "different other base data acquisition container." This makes it possible to deter resource tightness due to generation of too many containers.

Only one monitoring container 113a exists in the dHCI system 100.

The other base data acquisition container (base B) 113b mounts the back-end PV (base B) (FIG. 3), stores and makes reference to the base B monitoring data 111c. Upon receiving a recall request of the base B monitoring data 111c from the monitoring container 113a, the other base data acquisition container (base B) 113b acquires the monitoring data from the base B and stores the monitoring data in the back-end PV (base B).

The other base data acquisition container (base C) 113c mounts the back-end PV (base C) (FIG. 3), stores and makes reference to the base C monitoring data 111d. Upon receiving a recall request of the base C monitoring data 111d, the other base data acquisition container (base C) 113b acquires monitoring data from the base C and stores the monitoring data in the back-end PV (base C). The other base monitoring data acquisition container exists for each dHCI system 100 of the other base with which the dHCI system 100 of the own base collaborates.

The user container 113d is a container that executes a user application.

The memory 113 stores another base data (base B) acquisition container (base C) 113c1 (FIG. 18) generated when the dHCI system 100A fails to communicate with the dHCI system 100B of the base B. The other base data (base B) acquisition container (base C) 113c1 acquires the monitoring data of the base B and the file, directory information from the base C. The file, directory information is list information of files and directories of the corresponding data. The other base data (base B) acquisition container (base C) 113c1 mounts the back-end PV (base B) (FIG. 3) and requests the dHCI system 100C of the base C to acquire the monitoring data of the base B and the file, directory information. The other base data (base B) acquisition container (base C) 113c1 acquires the monitoring data of the base B and the file, directory information via the dHCI system 100C of the base C.

Similarly, the memory 113 stores the other base data (base C) acquisition container (base B) (not shown) generated when the dHCI system 100A fails to communicate with the dHCI system 100C of the base C. The other base data (base C) acquisition container (base B) mounts the back-end PV (base C) (FIG. 3) and requests the dHCI system 100B of the base B to acquire the monitoring data of the base C and the file, directory information. The other base data (base C) acquisition container (base B) acquires the monitoring data of the base C and the file, directory information via the dHCI system 100B of the base B.

Figure 4:
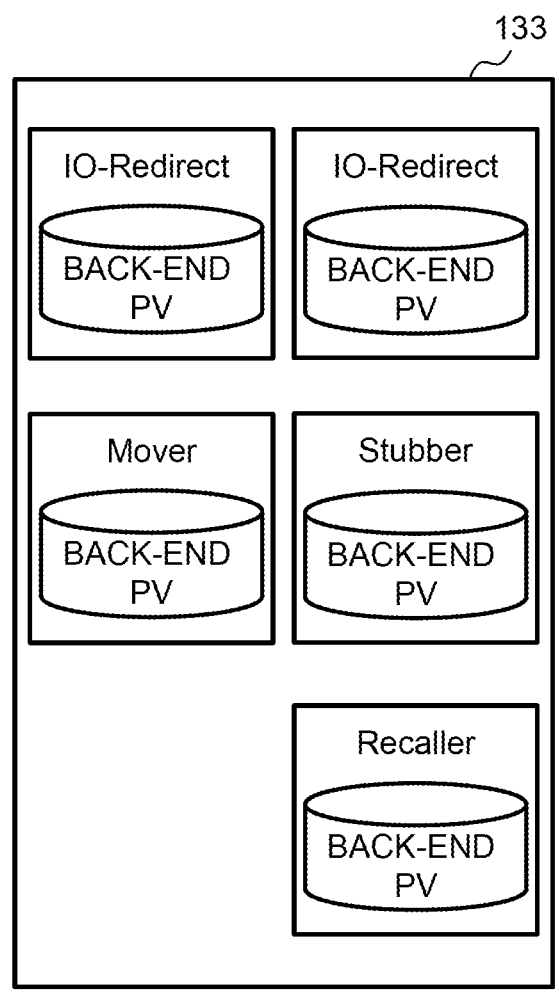
FIG. 4 is a diagram illustrating a software configuration of the dHCI according to the embodiment.

Here, a software configuration of the dHCI 110 will be described. FIG. 3 and FIG. 4 are diagrams illustrating a software configuration of the dHCI 110 according to the embodiment.

As shown in FIG. 3, the dHCI 110 includes a container infrastructure 131, a back-end storage infrastructure 132 and a container group 133 managed by a host OS (operating system) 130. The host OSs 130-1, 130-2 and 130-3 are executed by the dHCIs 110-1, 110-2 and 110-3 respectively. The container infrastructures 131-1, 131-2 and 131-3, the back-end storage infrastructures 132-1, 132-2 and 132-3, and the container groups 133-1, 133-2 and 133-3 are executed and managed on the host OSs 130-1, 130-2 and 130-3 respectively.

The back-end storage infrastructures 132-1, 132-2 and 132-3 provide storage objects including a back-end file system that provides back-end PVs to the container groups 133-1, 133-2 and 133-3. The back-end file system stores a back-end PV (base A), a back-end PV (base B) and a back-end PV (base C), and back-end PVs 1 to 3. The back-end PV (base A), the back-end PV (base B) and the back-end PV (base C) are storage areas for the dHCI system 100 to store monitoring data. The back-end PVs 1 to 3 are storage areas for the dHCI system 100 to store user data.

As shown in FIG. 3 and FIG. 4, the container group 133 includes a monitoring container 113a, another base data acquisition container (base B) 113b, and another base data acquisition container (base C) 113c. The container group 133 includes a user container 113d, an IO-Redirect, Mover, Stubber, and Recaller.

As shown in FIG. 3, the monitoring container 113a mounts the back-end PV (base A), the back-end PV (base B) and the back-end PV (base C) of the back-end file system. The other base data acquisition container (base B) 113b mounts the back-end PV (base B) of the back-end file system. The other base data acquisition container (base C) 113c mounts the back-end PV (base C) of the back-end file system. The container infrastructure 131 on which the monitoring container 113a, the other base data acquisition container (base B) 113b and the other base data acquisition container (base C) 113c operate may be any one of the container infrastructures 131-1, 131-2 and 131-3.

Furthermore, as shown in FIG. 4, the IO-Redirect mounts any one of the back-end PVs (any one of PV1 to PV3) (FIG. 3) and re-directs the I/O received from the container of the container group 133 to the back-end PV. The IC-Redirect extracts the file, directory information from the I/O at the time of re-direct.

The Mover transfers update information to an external cloud storage 4 (FIG. 1) or the dHCI system 100 of the other base based on the file, directory information extracted by the IC-Redirect.

Upon fulfillment of predetermined conditions (for example, the period during which the corresponding data is not accessed after data is stored has excessed a retention period defined in the retention period information table T3 (FIG. 7)), the Stubber converts the corresponding data to a stub file.

Upon detection of a read of the data converted to a stub file by the IC-Redirect, the Recaller receives a recall request from the IC-Redirect and acquires necessary data from the cloud storage 4 or the dHCI system 100 of the other base.

Returning to the description in FIG. 2, the management table group 111a includes the coordinated other base information table T1 (FIG. 5), another base communication container information table T2 (FIG. 6), a retention period information table T3 (FIG. 7) and a container lifetime information table T4 (FIG. 8).

(Coordinated Other Base Information Table T1)

The coordinated other base information table T1 is a table enumerating the dHCI systems 100 of the other bases with which the dHCI system 100 of the own base is collaborating. As shown in FIG. 5, the coordinated other base information table T1 includes columns such as "base," "IP/host" and "authentication information."

The "base" is identification information of another base with which the own base collaborates. The "IP/host" is an IP address of the host (dHCI system 100) of the "base." The "authentication information" is information used for authentication of the dHCI system 100 of the own base by the dHCI system 100 of the other base when the dHCI system 100 of the own base collaborates with the dHCI system 100 of the other base.

Note that the priority when the own base selects different other bases to request the bases to acquire and recall a file, directory list of the monitoring data of some other base, follows the entry order of the coordinated other base information table T1. For example, suppose that there are entries in the coordinated other base information table T1 in order of bases "B", "C" and "D." In this case, for example, the base "B" is selected first as the base requested by the own base to acquire and recall the file, directory list of the monitoring data of the base "C" or the base "D" is selected when the base "B" is not available.

(Other Base Communication Container Information Table T2)

As shown in FIG. 6, the other base communication container information table T2 includes columns such as "container," "communication destination base," "mount PV" and "priority."

The "container" is identification information of a container that communicates with another base (base B, base C). The "communication destination base" indicates a destination base with which a container identified by the "container" communicates. The "mount PV" indicates a back-end PV on the file system mounted on the container identified by the "container." The "priority" shows that a container with a smaller value is used with higher priority among "containers" having an identical "mount PV."

Examples of the "container" whose "mount PV" is "back-end PV (base B)" include "container-1" and "container-3." Since "priority" of the "container-1" is "0" and "priority" of the "container-3" is "1," the "container-1" is used with higher priority to acquire monitoring data of the base B. However, when communication between the base A, which is the own base, and the base B is not possible, the "container-3" is used instead of the "container-1." The "container-3" is a container temporarily started to acquire the monitoring data of the base B and a list of the data via the base C instead of the "container-1." Since the "container-3" is still within a lifetime (FIG. 8), it is alive without disappearing. By reusing containers which are alive without disappearing, it is possible to ensure efficient use of resources without generating overlapping containers.

Note that the other base communication container information table T2 manages a combination of "container," "communication destination base" and "mount PV." The "container" is, for example, another computer data acquisition container. The "communication destination base" is, for example, another computer system of a communication destination of the other computer data acquisition container. The "mount PV" indicates, for example, the other computer system at the acquisition destination of other monitoring data acquired by the other computer data acquisition container.

(Retention Period Information Table T3)

The retention period information table T3 stores retention period information as to a time period during which the monitoring data stored in the back-end PV is not accessed before being converted to a stub file. As shown in FIG. 7, the retention period information table T3 includes columns such as "target data" and "retention period." In the example shown in FIG. 7, the "target data" is "global," that is, all the monitoring data is converted to a stub file when "1 h" has elapsed after final access. Note that although a uniform retention period is defined for all the monitoring data in FIG. 7, the retention period may be defined for each base or for every plurality of dHCI systems 100 of the same base.

(Container Lifetime Information Table T4)

The container lifetime information table T4 stores container lifetime information that defines for each container, a lifetime during which a container is alive after it is started. As shown in FIG. 8, the container lifetime information table T4 includes columns such as "container" and "lifetime." The "container" is identification information of a container. The "lifetime" indicates a time period during which the container identified by "container" is consecutively not accessed before being stopped. However, the "lifetime" being "0" means that the corresponding container is always alive irrespective of the "lifetime." In the example shown in FIG. 8, the container with "container-1" is always alive. The container with "container-3" has a "lifetime" of "2 hours." Containers whose "lifetimes" have expired will be stopped and cease to exist and their entries are deleted from the other base communication container information table T2 (FIG. 6).

Note that according to the present embodiment, one dHCI system 100 is installed in each base 3, and so each base 3 is identified with each dHCI system 100. However, when a plurality of dHCI systems 100 are installed in each base 3, each "base" which will be described in FIG. and FIG. 6 is read as the "dHCI system 100." Thus, the coordinated other base information table T1 is read as a "table that manages information of the coordinated dHCI system." The other base communication container information table T2 is read as a "table that manages information on the container to communicate with another dHCI system."

(Basic Operation of dHCI System 100 Under Normal Conditions)

Figure 9:
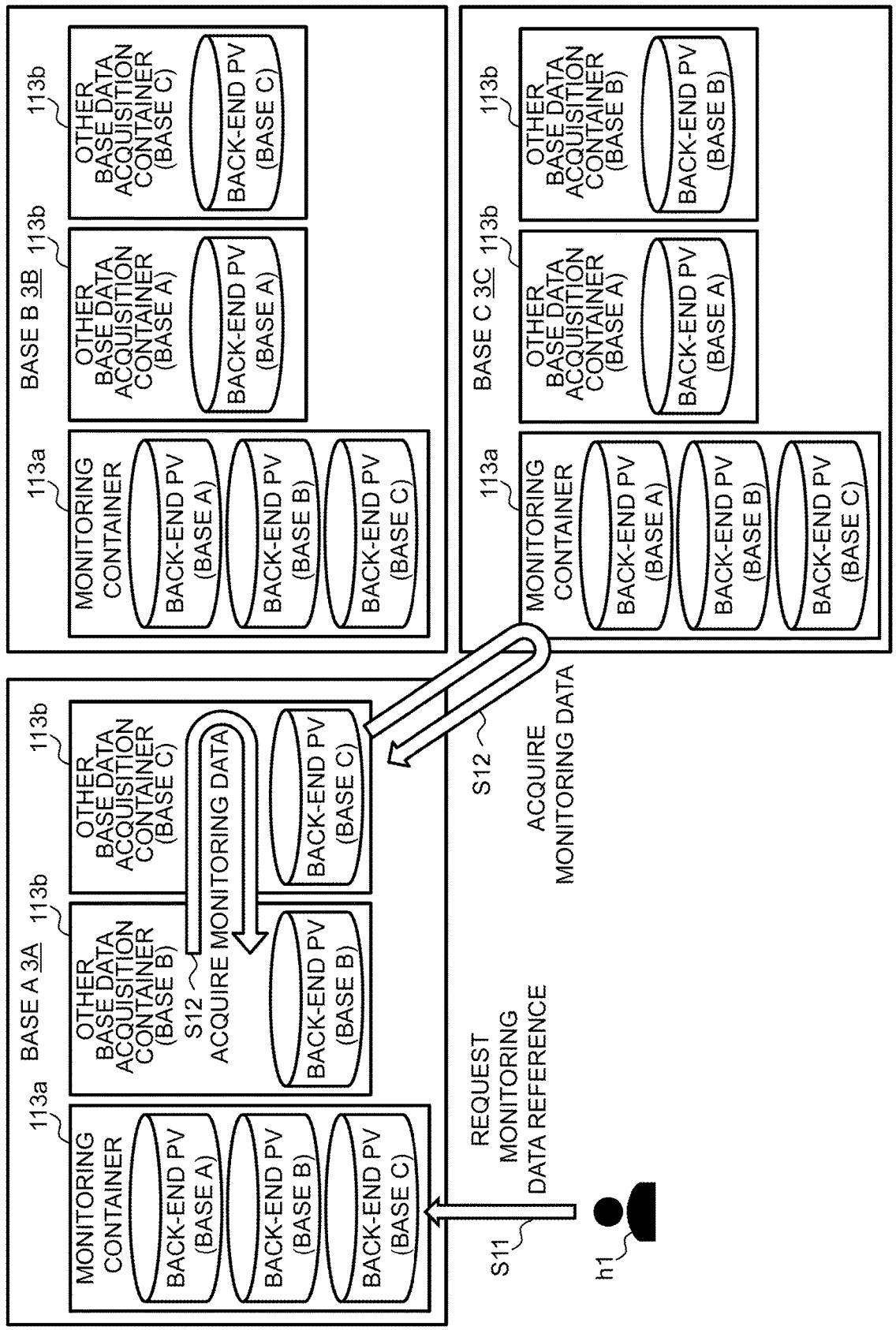
FIG. 9 is a diagram to describe basic operation of the dHCI system according to the embodiment under normal conditions.

FIG. 9 is a diagram to describe basic operation of the dHCI system 100 according to the embodiment under normal conditions. FIG. 9 describes an example where the dHCI system 100A of the own base (base A) acquires monitoring data from the dHCI system 100B of the other base (base B) and acquires monitoring data from the dHCI system 100C of the other base (base C).

First, in step S11, an administrator hl of the base A inputs a reference request of the monitoring data of the base A, base B and the base C from the management terminal 31A. Here, in the cases of the base B and the base C (other bases) unlike the own base (base A), the monitoring data of the base B and the base C stored in the base A after a lapse of a certain period of time since the final access is converted to a stub file.

In next step S12, the monitoring container 113a of the base A requests the other base data acquisition container (base B) 113b to acquire monitoring data of the base B based on information relating to the "stub file of the base B." The other base data acquisition container (base B) 113b of the base A stores the corresponding monitoring data acquired from the monitoring container 113a of the base B in the back-end PV (base B) mounted on itself in response to this recall request.

Likewise at the base A, the monitoring container 113a requests the other base data acquisition container (base C) 113c to acquire monitoring data of the base C based on information relating to the "stub file of the base C." The other base data acquisition container (base C) 113c of the base A stores the corresponding monitoring data acquired from the monitoring container 113a of the base C in the back-end PV (base C) mounted on itself in response to this recall request.

The back-end PVs of the other base data acquisition container (base B) 113b and the other base data acquisition container (base C) 113c are also mounted on the monitoring container 113a of the base A. Thus, the corresponding monitoring data of the base B and the base C is integrated at the monitoring container 113a of the base A. By carrying out similar processing also on the base B and the base C, it is possible for any base to update, reference and compare the monitoring data of all the other bases.

(Basic Operation of dHCI System 100 in Case of Fault)

Figure 10:
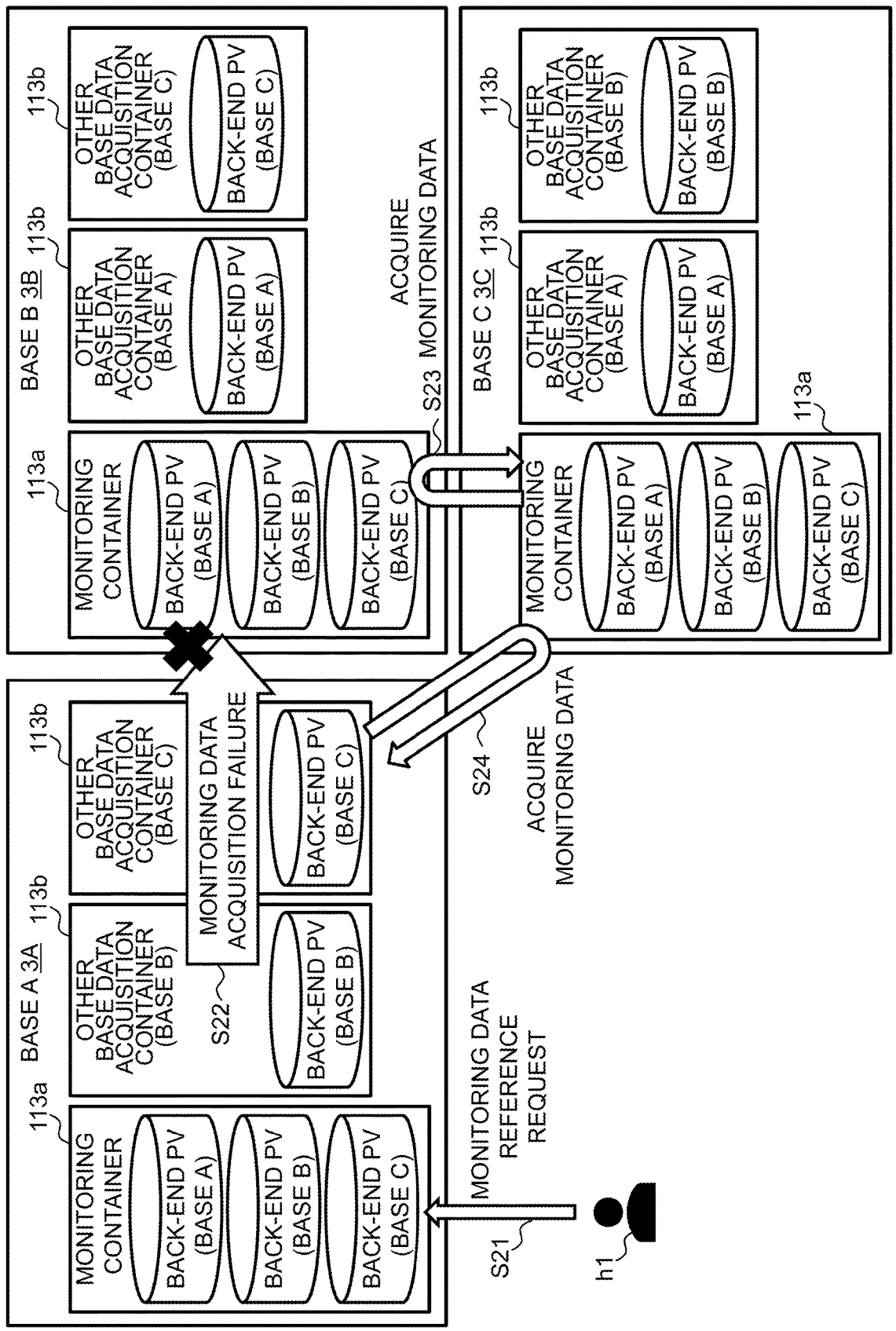
FIG. 10 is a diagram to describe basic operation of the dHCI system according to the embodiment in case of fault.

FIG. 10 is a diagram to describe basic operation of the dHCI system 100 according to the embodiment in case of fault. In FIG. 10, the dHCI system 100A of the own base (base A) acquires monitoring data from the dHCI system 100B of the other base (base B) and acquires monitoring data from the dHCI system 100C of the other base (base C). Due to a communication fault between the base A and the base B, the dHCI system 100A fails to acquire the monitoring data of the dHCI system 100B. Thus, an example will be described where the dHCI system 100A acquires monitoring data of the dHCI system 100B via the dHCI system 100C of the base C instead.

First, in step S21, the administrator hl of the base A inputs a reference request for the monitoring data of the base A, the base B and the base C from the management terminal 31A. Here, as in the case of FIG. 9, since a certain period has elapsed since the final access, suppose that the monitoring data of the base B and the base C stored in the base A is converted to a stub file.

In next step S22, the monitoring container 113a of the base A tries to acquire the corresponding monitoring data from the other base data acquisition container (base B) 113b based on information relating to the "stub file of the base B." However, communication from the base A to the base B fails.

In step S23, independently of step S22, the monitoring container 113a of the base C acquires the monitoring data of the base B from the back-end PV (base B) of the monitoring container 113a of the base B. The monitoring container 113a of the base C stores the acquired monitoring data of the base B in the own back-end PV (base B).

In step S24, the monitoring container 113a in the base A newly generates (deploys) other base data (base B) acquisition container (base C) (not shown). The monitoring container 113a requests the other base data (base B) acquisition container (base C) (not shown) to acquire the monitoring data of the base B from the base C.

The other base data (base B) acquisition container (base C) (not shown) acquires the monitoring data of the base B from the back-end PV (base B) of the monitoring container 113a of the base C. The other base data (base B) acquisition container (base C) (not shown) stores the acquired monitoring data of the base B in the own back-end PV (base B).

Note that acquisition of the monitoring data of the base C for the base A is similar to the acquisition in FIG. 9. The base B directly acquires the monitoring data from the base C and acquires the monitoring data of the base A via the base C. The base C directly acquires the monitoring data from the base A and the base B. In this way, even if communication between the base A and the base B is not possible, the monitoring data of all the bases is integrated and it is possible for any base to update, reference and compare the data via the base C.

(Acquisition of File, Directory Information on Other Base at Time of Administrator Authentication or the Like)

FIG. 11 is a diagram to describe acquisition and reflection (under normal conditions) of file, directory information of the other base at the time of administrator authentication or the like according to the embodiment. FIG. 11 illustrates acquisition of monitoring data from the base C in which communication with the base A is successful. Basically, each base retains data of the other base as a stub file, and the file, directory information may not be kept up to date and old files may disappear or the number of new files may increase. For that reason, with administrator authentication or the like as a predetermined opportunity, the file, directory information of the other bases needs to be kept up to date.

First, In step S31, the monitoring container 113a of the base A receives a specific request for authentication or the like input by the administrator hl.

Authentication is an example of the specific request. The specific request is not limited to authentication, but it is possible to accept any opportunity whereby the back-end PV (base A), the back-end PV (base B), or the back-end PV (base C) mounted on the monitoring container 113a may be referenced.

In next step S32, the monitoring container 113a transmits an information update request to the other base data acquisition container (base C) 113c for communication with the base C. In next step S33, the other base data acquisition container (base C) 113c acquires latest information such as file, directory information from the monitoring container 113a of the base C. In next step S34, the other base data acquisition container (base C) 113c of the base A updates information on the back-end PV (base C) mounted on itself based on the latest information such as the acquired file, directory information.

Figure 12:
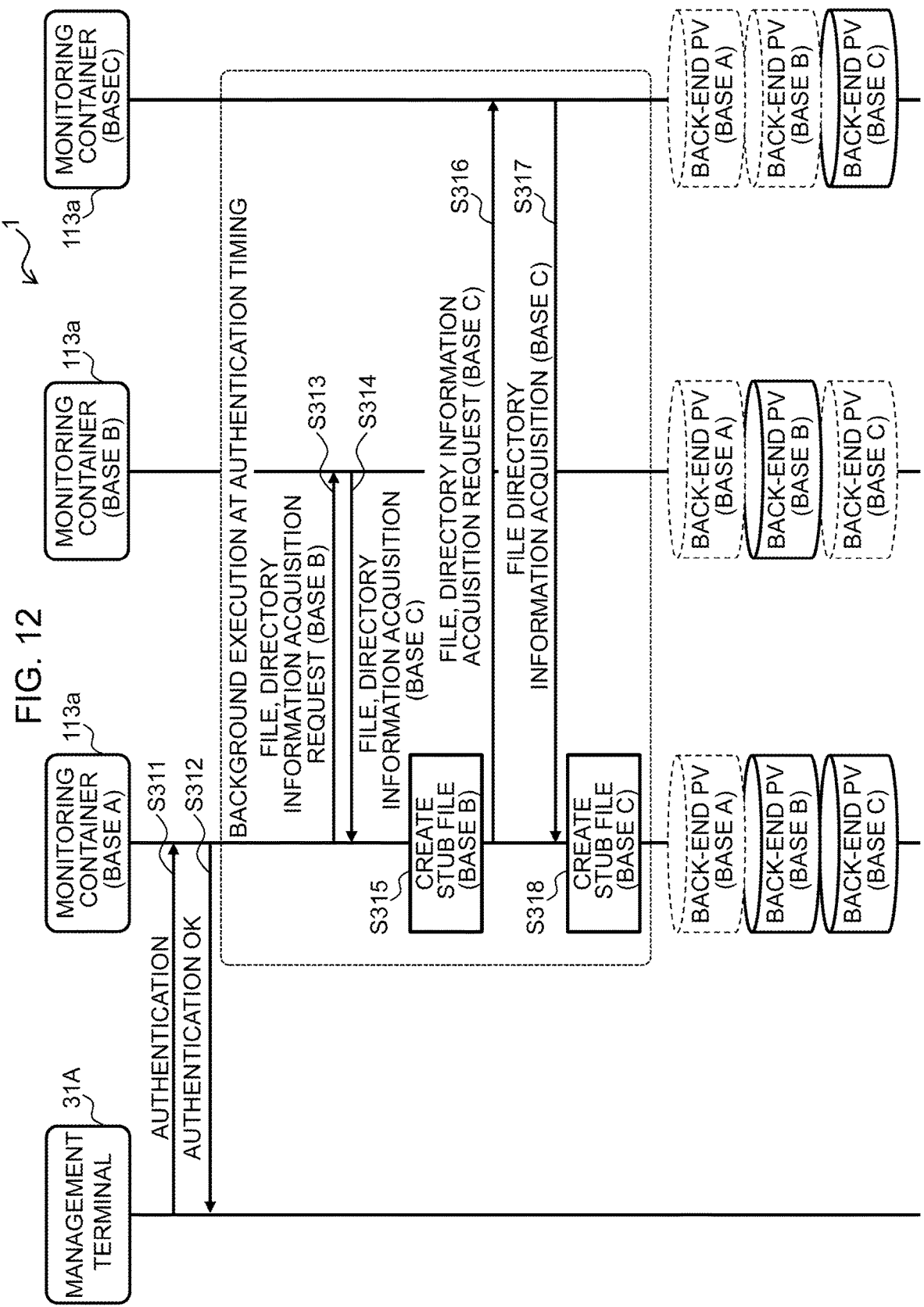
FIG. 12 is a sequence diagram illustrating acquisition and reflection (under normal conditions) of file, directory information of the other base at time of administrator authentication or the like according to the embodiment.

FIG. 12 is a sequence diagram illustrating acquisition and reflection (under normal conditions) of the file, directory information of the other base at the time of administrator authentication or the like according to the embodiment. The sequence diagram in FIG. 12 corresponds to the explanatory diagram in FIG. 11.

First, in step S311, the management terminal 31A of the base A in the data sharing system 1 transmits the authentication information input by the administrator hl to the monitoring container 113a of the base A. In next step S312, the monitoring container 113a of the base A transmits the authentication result of the administrator to the management terminal 31A.

With steps S311 and S312 as predetermined opportunities, the monitoring container 113a of the base A executes acquisition of file, directory information of monitoring data of each base in the background on the monitoring container 113a of the base B and the base C.

In step S313, the monitoring container 113a of the base A transmits a file, directory information acquisition request to the monitoring container 113a of the base B. In step S314, the monitoring container 113a of the base B transmits the file, directory information of the own base to the monitoring container 113a of the base A in response to the file, directory information acquisition request from the monitoring container 113a of the base A. In step S315, upon receiving the file, directory information from the monitoring container 113a of the base B, the monitoring container 113a of the base A creates a stub file of the monitoring data of the base B based on the received file, directory information.

Similarly, in step S316 to S318, a stub file of the monitoring data of the base C is created in the monitoring container 113a of the base A.

(Recall of Monitoring Data of Other Base (Under Normal Conditions)

Figure 13:
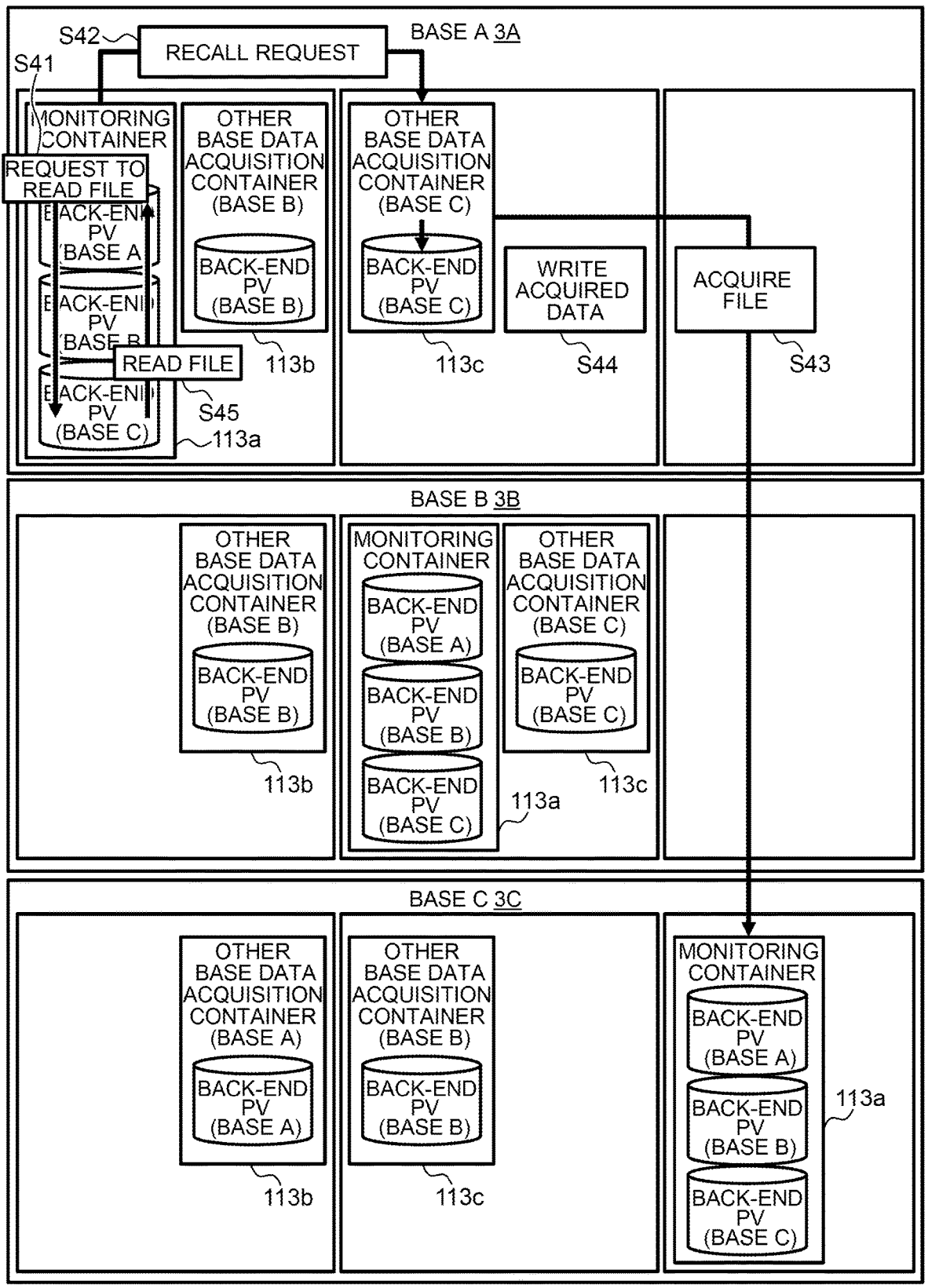
FIG. 13 is a diagram to describe a recall (under normal conditions) of monitoring data of the other base according to the embodiment.

FIG. 13 is a diagram to describe a recall (under normal conditions) of monitoring data of the other base according to the embodiment. FIG. 13 describes an example where when communication between the base A and the base C is successful, the base A makes a recall to acquire a file corresponding to a stub file of the monitoring data of the base C from the base C.

First, in step S41, the monitoring container 113a of the base A requests the back-end PV (base C) mounted on itself to read a file of the monitoring data of the base C. In next step S42, since the file requested to be read is a stub file, the monitoring container 113a of the base A requests the other base data acquisition container (base C) 113c to recall the monitoring data corresponding to the stub file.

In next step S43, the other base data acquisition container (base C) 113c of the base A acquires a file to be recalled from the monitoring container 113a of the base C. In next step S44, the other base data acquisition container (base C) 113c of the base A writes the acquired file to the back-end PV (base C) 113c mounted on itself. In next step S45, the monitoring container 113a of the base A reads the file of the target monitoring data with reference to the back-end PV (base C) mounted on itself.

Figure 14:
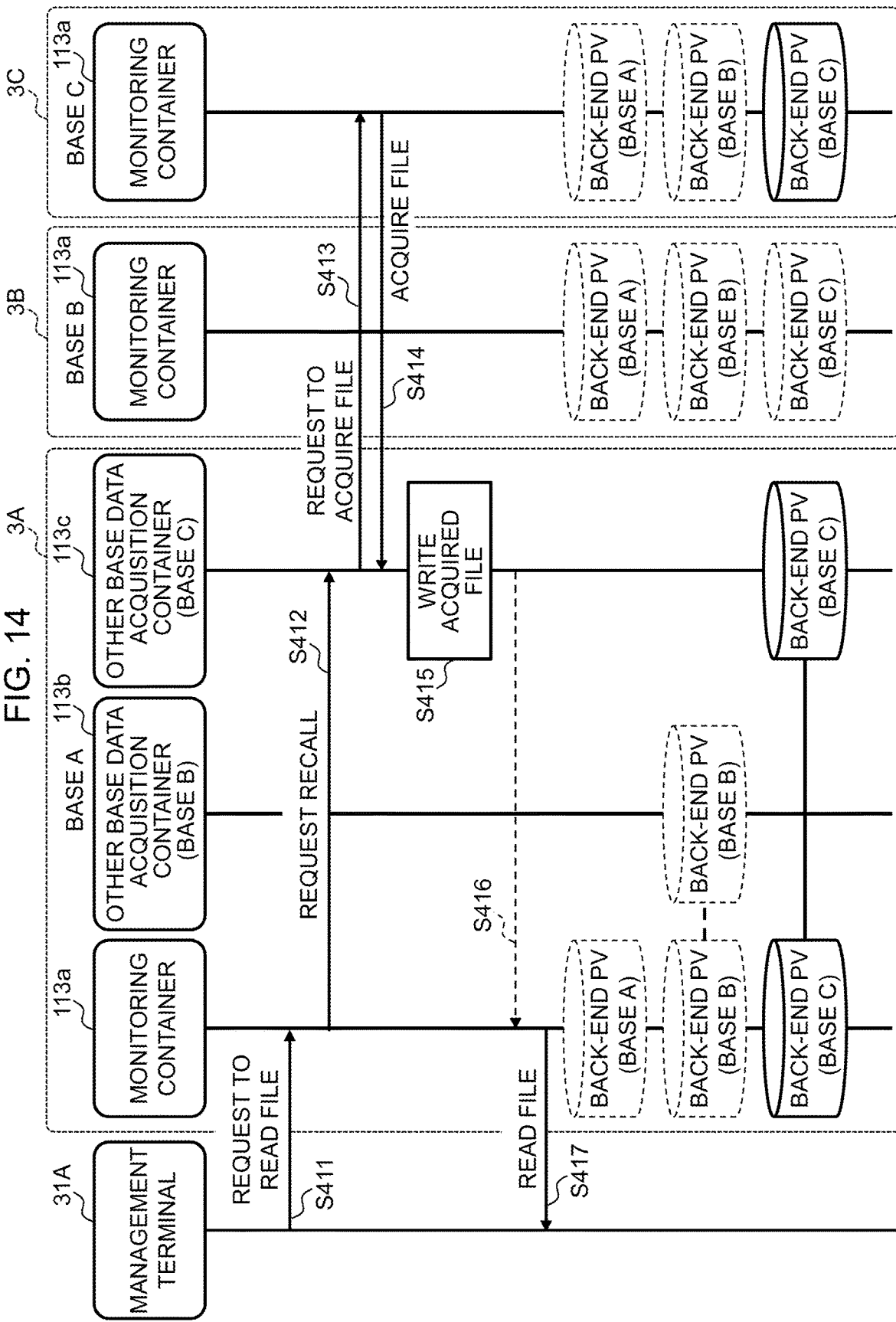
FIG. 14 is a sequence diagram to describe a recall (under normal conditions) of monitoring data of the other base according to the embodiment.

FIG. 14 is a sequence diagram illustrating a recall (under normal conditions) of monitoring data of the other base according to the embodiment. The sequence diagram in FIG. 14 corresponds to the explanatory diagram in FIG. 13.

First, in step S411, the management terminal 31A of the base A transmits a request to read the monitoring data of the base C to the monitoring container 113a of the base A. In next step S412, since the monitoring data of the base C retained in the own apparatus is a stub file, the monitoring container 113a of the base A requests the other base data acquisition container (base C) 113c to recall the monitoring data of the base C.

In next step S413, the other base data acquisition container (base C) 113c of the base A transmits a request to acquire a file of the monitoring data of the base C to the monitoring container 113a of the base C. In next step S414, the monitoring container 113a of the base C makes reference to the back-end PV (base C) mounted on itself in response to the file acquisition request. The monitoring container 113a of the base C reads the file of the monitoring data of the base C and transmits the file to the other base data acquisition container (base C) 113c of the base A.

In next step S415, the other base data acquisition container (base C) 113c of the base A writes the received file to the back-end PV (base C) mounted on itself. The back-end PV (base C) mounted on the other base data acquisition container (base C) 113c of the base A is also mounted on the monitoring container 113a of the base A. Thus, in step S416, the file written to the back-end PV (base C) of the other base data acquisition container (base C) in step S415 is also made readable to the monitoring container 113a of the base A. In step S417, the monitoring container 113a of the base A reads the file of monitoring data requested from the back-end PV (base C) mounted on itself and transmits the file to the management terminal 31A.

(Acquisition of File, Directory Information of Monitoring Data (in Case of Communication Failure))

Figure 15:
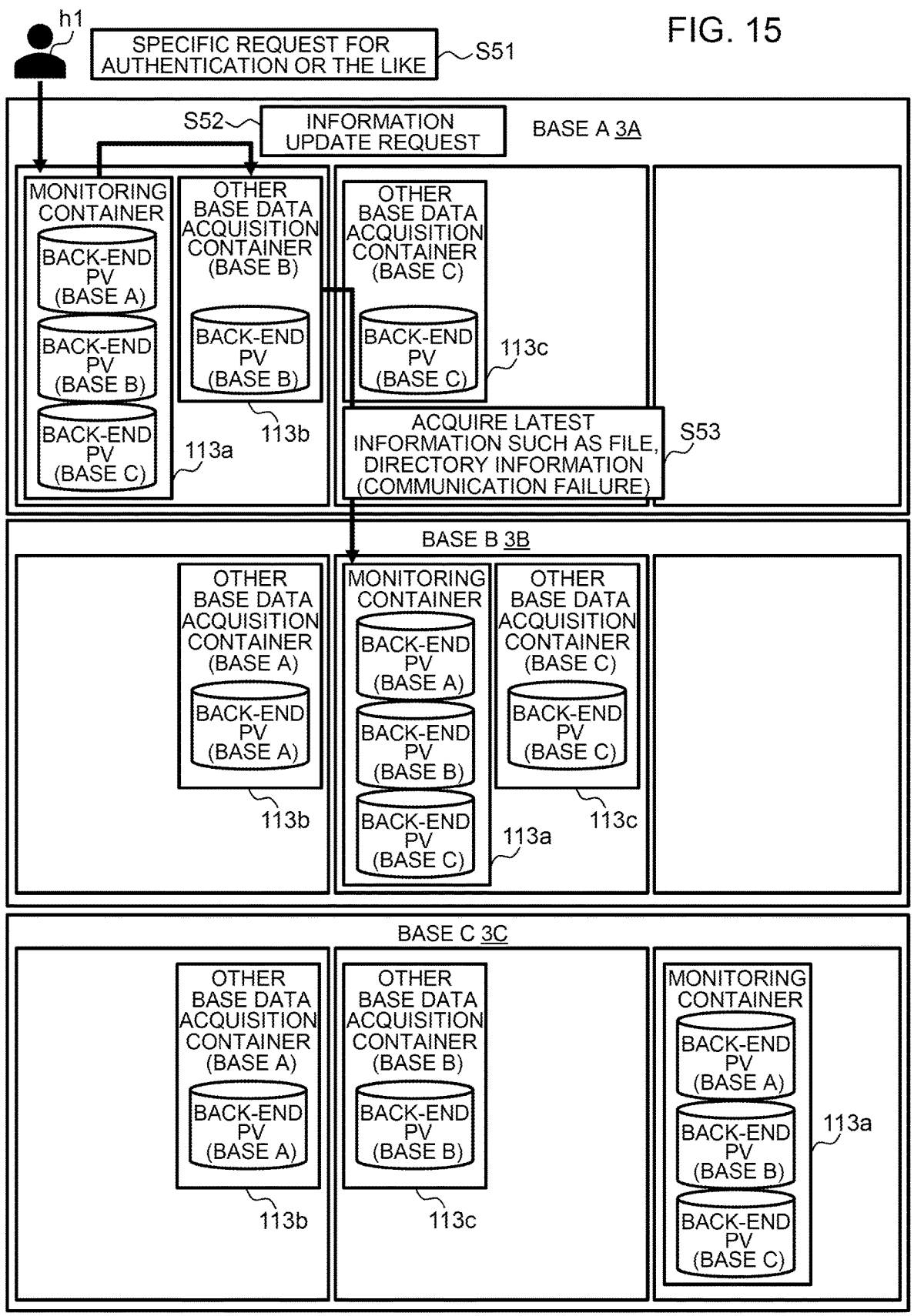
FIG. 15 is a diagram to describe acquisition of file, directory information (in case of communication failure) of monitoring data at time of administrator authentication or the like according to the embodiment.
Figure 16:
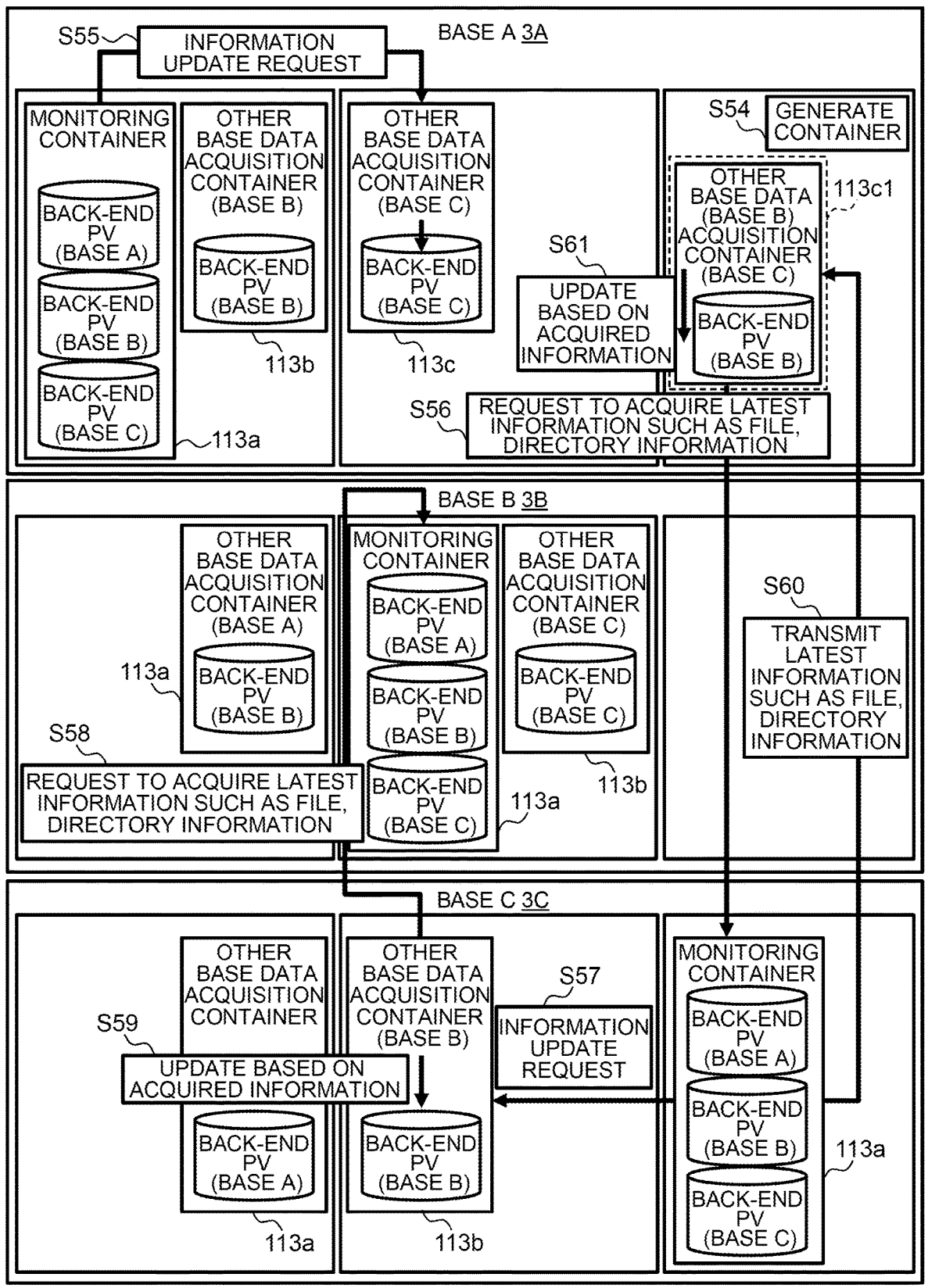
FIG. 16 is a diagram to describe acquisition of file, directory information (in case of communication failure) of monitoring data via the other base according to the embodiment.

FIG. 15 is a diagram to describe acquisition of file, directory information of monitoring data (in case of communication failure) at the time of administrator authentication or the like according to the embodiment. FIG. 16 is a diagram to describe acquisition of file, directory information (in case of communication failure) of monitoring data via another base according to the embodiment. FIG. 16 shows an example where a file of monitoring data of the base B corresponding to a stub file is acquired via the base C when communication between the base A and the base B fails as shown in FIG.

In FIG. 15, in step S51 first, the monitoring container 113a of the base A receives a specific request for administrator authentication or the like input by the administrator hl. In next step S52, the monitoring container 113a transmits an information update request to the other base data acquisition container (base C) 113c for communication with the base C in response to the specific request. In next step S53, although the other base data acquisition container (base C) 113c of the base A tries to acquire latest information of the file, directory information from the monitoring container 113a of the base B, the communication fails.

Thus, as shown in FIG. 16, the monitoring container 113a of the base A generates another base data (base B) acquisition container (base C) 113c1 to request the base C to acquire latest information of the file, directory information of the base B in step S54. The other base data (base B) acquisition container (base C) 113c1 is the container in which the back-end PV (base B) is mounted.

In next step S55, the monitoring container 113a of the base A transmits an information update request of latest information of the file, directory information to the other base data (base B) acquisition container (base C) 113c1. In next step S56, the other base data (base B) acquisition container (base C) 113c1 transmits the latest information acquisition request of the file, directory information to the monitoring container 113a of the base C.

In next step S57, the monitoring container 113a of the base C transmits the latest information acquisition request of the file, directory information to the other base data acquisition container (base B) 113b.

In step S58, the other base data acquisition container (base B) 113b of the base C transmits the latest information acquisition request of the file, directory information to the monitoring container 113a of the base B in response to the latest information acquisition request of the file, directory information. In next step S59, the other base data acquisition container (base B) 113b of the base C updates the information of the back-end PV (base B) mounted on itself with the latest information of the file, directory information of the base B acquired from the base B.

In next step S60, the monitoring container 113a of the base C reads the latest information of the file, directory information stored in the back-end PV (base B) mounted on itself. The monitoring container 113a transmits the latest information of the file, directory information to the other base data (base B) acquisition container (base C) 113c1 of the base A. The other base data (base B) acquisition container (base C) 113c1 of the base A writes the latest information of the file, directory information of the base B acquired from the monitoring container 113a of the base C to the back-end PV (base B) mounted on itself. In this way, the administrator hl can make reference to the latest file, directory information of the base B via the monitoring container 113a of the base A.

Figure 17:
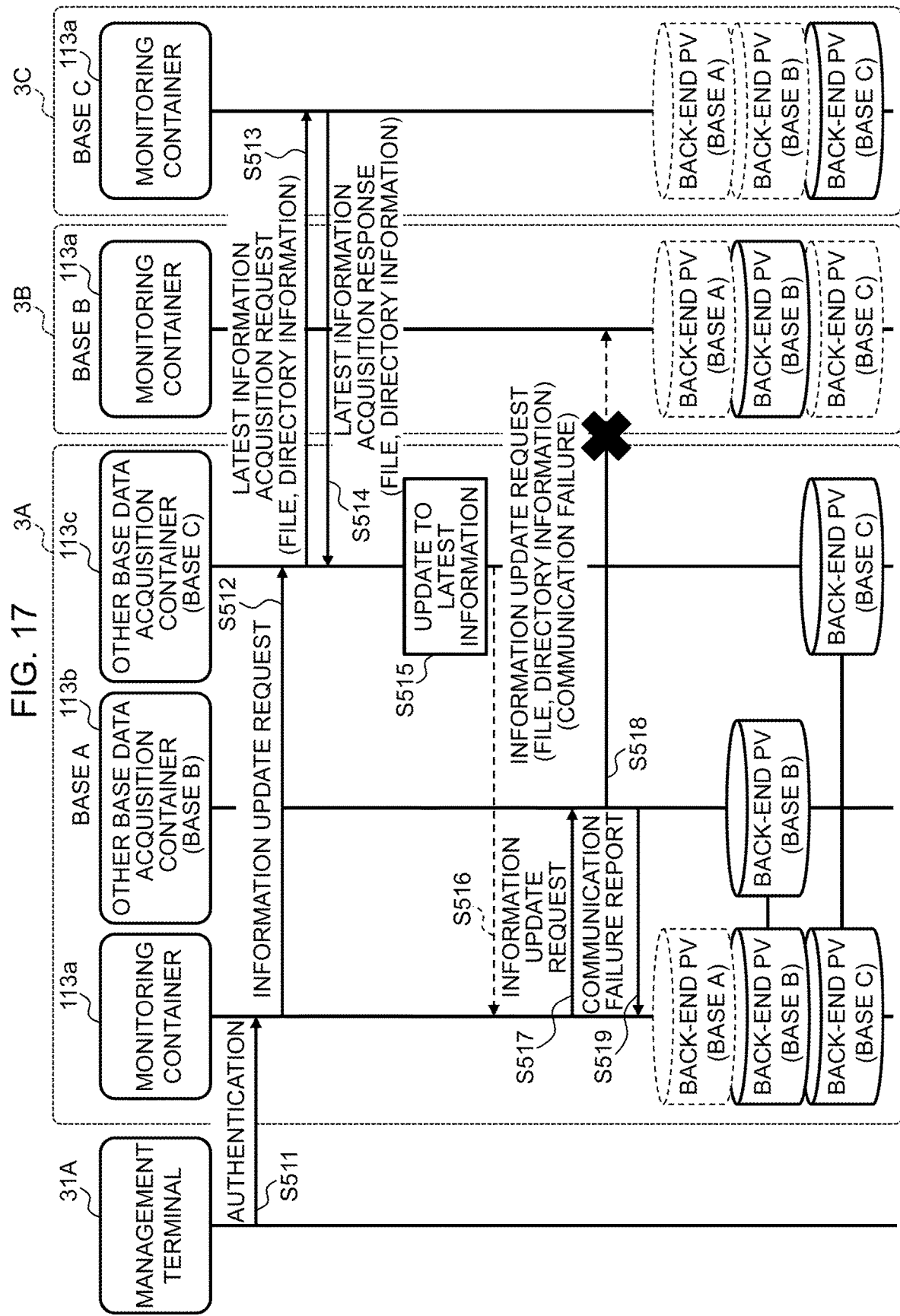
FIG. 17 is a sequence diagram illustrating acquisition of file, directory information (in case of communication failure) of monitoring data of the other base according to the embodiment.
Figure 18:
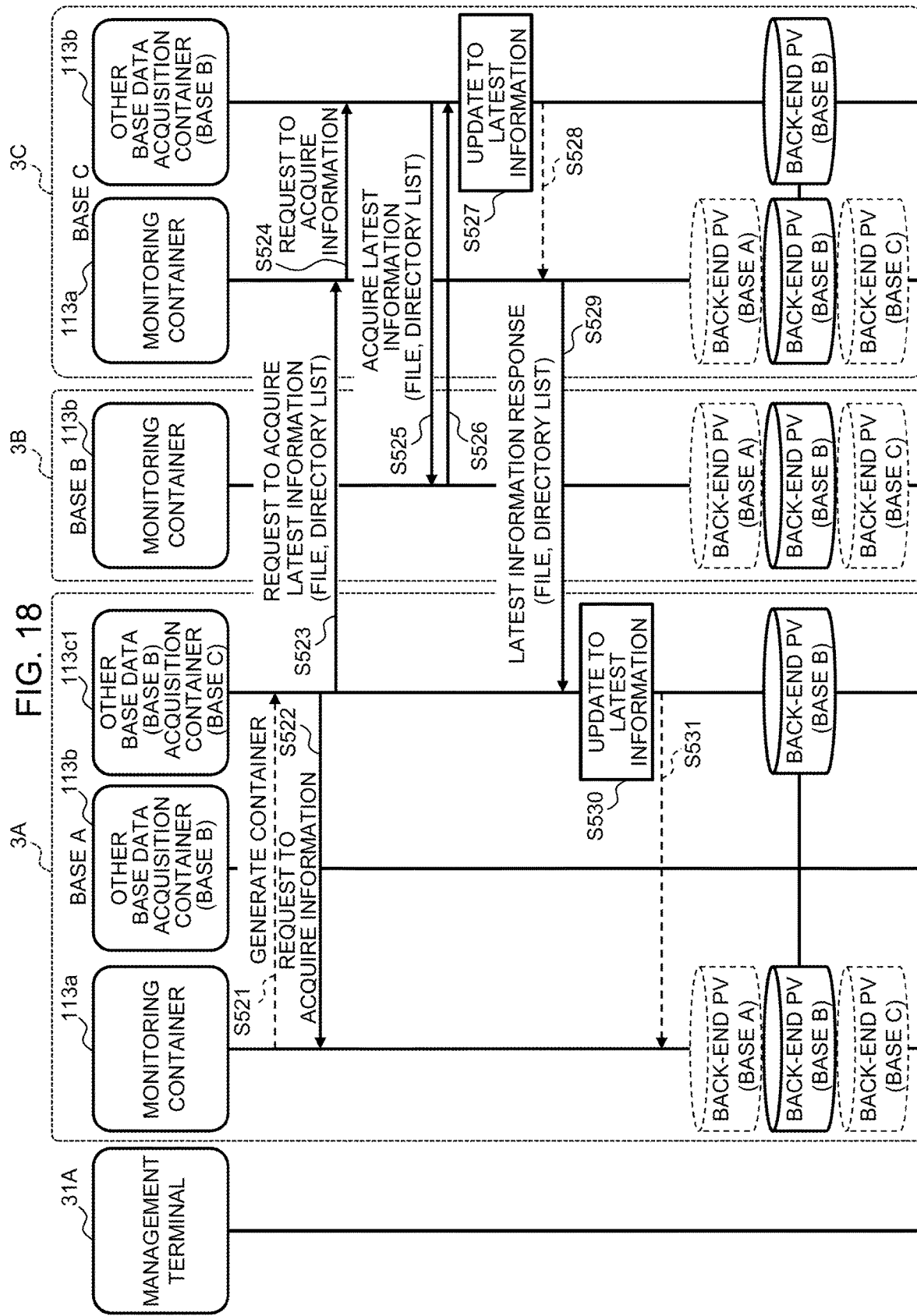
FIG. 18 is a sequence diagram illustrating acquisition of directory, file information (in case of communication failure) of monitoring data via the other base according to the embodiment.

FIG. 17 is a sequence diagram illustrating acquisition of the file, directory information (in case of communication failure) of the monitoring data of another base according to the embodiment. FIG. 18 is a sequence diagram illustrating acquisition of the directory, file information (in case of communication failure) of the monitoring data via another base according to the embodiment. The sequence diagram in FIG. 17 corresponds to the explanatory diagram in FIG. 15 and the sequence diagram in FIG. 18 corresponds to the explanatory diagram in FIG. 16.

In FIG. 17, the latest information of the directory, file information of the monitoring data of the base B and the base C are requested. An example is shown in which acquisition of the latest information from the base B is successful, whereas acquisition of the latest information from the base C fails. Note that the order in which the latest information acquisition requests of the directory, file information of the monitoring data of the base B and the base C are transmitted is irrelevant.

As shown in FIG. 17, in step S511, the management terminal 31A transmits a specific request for authentication or the like by the administrator hl to the monitoring container 113a of the base A. In next step S512, the monitoring container 113a of the base A requests the latest information of the directory, file information of the monitoring data of the base C stored in the back-end PV (base C) mounted on itself from the other base data acquisition container (base C) 113c.

In next step S513, the other base data acquisition container (base C) 113c of the base A requests the monitoring container 113a of the base C to acquire the latest information of the directory, file information of the monitoring data of the base C. In next step S514, the monitoring container 113a of the base C transmits the latest information of the directory, file information of the monitoring data of the base C to the other base data acquisition container (base C) 113c of the base A with reference to the back-end PV (base C) mounted on itself. In next step S515, the other base data acquisition container (base C) 113c of the base A reflects the received latest information of the directory, file information of the monitoring data of the base C in the back-end PV (base C) mounted on itself.

In step S516, the monitoring container 113a of the base A is enabled to reference the latest directory, file information of the monitoring data of the base C with reference to the back-end PV (base C) mounted on itself.

On the other hand, in step S517, the monitoring container 113a of the base A requests the other base data acquisition container (base B) 113b to acquire the latest information of the directory, file information of the monitoring data of the base B stored in the back-end PV (base B) mounted on itself. In next step S518, the other base data acquisition container (base B) 113b of the base A requests the monitoring container 113a of the base B to acquire the latest information of the directory, file information of the monitoring data of the base B. However, in the acquisition of the latest information of the directory, file information in step S518, communication between the base A and the base B fails. In step S519, the other base data acquisition container (base B) 113b of the base A notifies the monitoring container 113a of the communication failure in step S518.

Thus, as shown in FIG. 18, in step S521, the monitoring container 113*a* of the base A generates another base data (base B) acquisition container (base C) 113*c*1 on the container infrastructure on which itself operates. The other base data (base B) acquisition container (base C) 113*c*1 is another computer data acquisition container, which is different from the other base data acquisition container (base C) 113*c*.

In next step S522, the monitoring container 113*a* of the base A requests the other base data (base B) acquisition container (base C) 113*c*1 to acquire the latest information of the directory, file information of the monitoring data of the base B. In next step S523, the other base data (base B) acquisition container (base C) 113*c*1 requests the monitoring container 113*a* of the base C to acquire the latest information of the directory, file information of the monitoring data of the base B.

In next step S524, the monitoring container 113*a* of the base C requests the other base data acquisition container (base B) 113*b* of the base C to acquire the latest information of the directory, file information of the monitoring data of the base B. In next step S525, the other base data acquisition container (base B) 113*b* of the base C requests the monitoring container 113*a* of the base B to acquire the latest information of the directory, file information of the monitoring data of the base B. In next step S526, the monitoring container 113*a* of the base B transmits the latest information of the directory, file information of the monitoring data of the base B to the other base data acquisition container (base B) 113*b* of the base C.

In next step S527, the other base data acquisition container (base B) 113*b* of the base C updates the back-end PV (base B) mounted on itself with the latest information of the directory, file information of the monitoring data of the base B acquired from the monitoring container 113*a* of the base B. In step S528, the monitoring container 113*a* of the base C is enabled to make reference to the latest information of the directory, file information of the monitoring data of the base B by referencing the back-end PV (base B) mounted on itself.

In next step S529, the monitoring container 113*a* of the base C transmits the latest information of the directory, file information of the monitoring data of the base B to the other base data (base B) acquisition container (base C) 113*c*1 of the base A with reference to the back-end PV (base B) mounted on itself.

In next step S530, the other base data (base B) acquisition container (base C) 113*c*1 of the base A stores the latest information of the directory, file information of the monitoring data of the base B received from the monitoring container 113*a* of the base C in the back-end PV (base C) mounted on itself. In step S531, the monitoring container 113*a* of the base A is enabled to make reference to the latest information of the directory, file information of the monitoring data of the base B by referencing the back-end PV (base B) mounted on itself.

(Recall of Monitoring Data at Time of Administrator Authentication or Like (in Case of Communication Failure))

Figure 19:
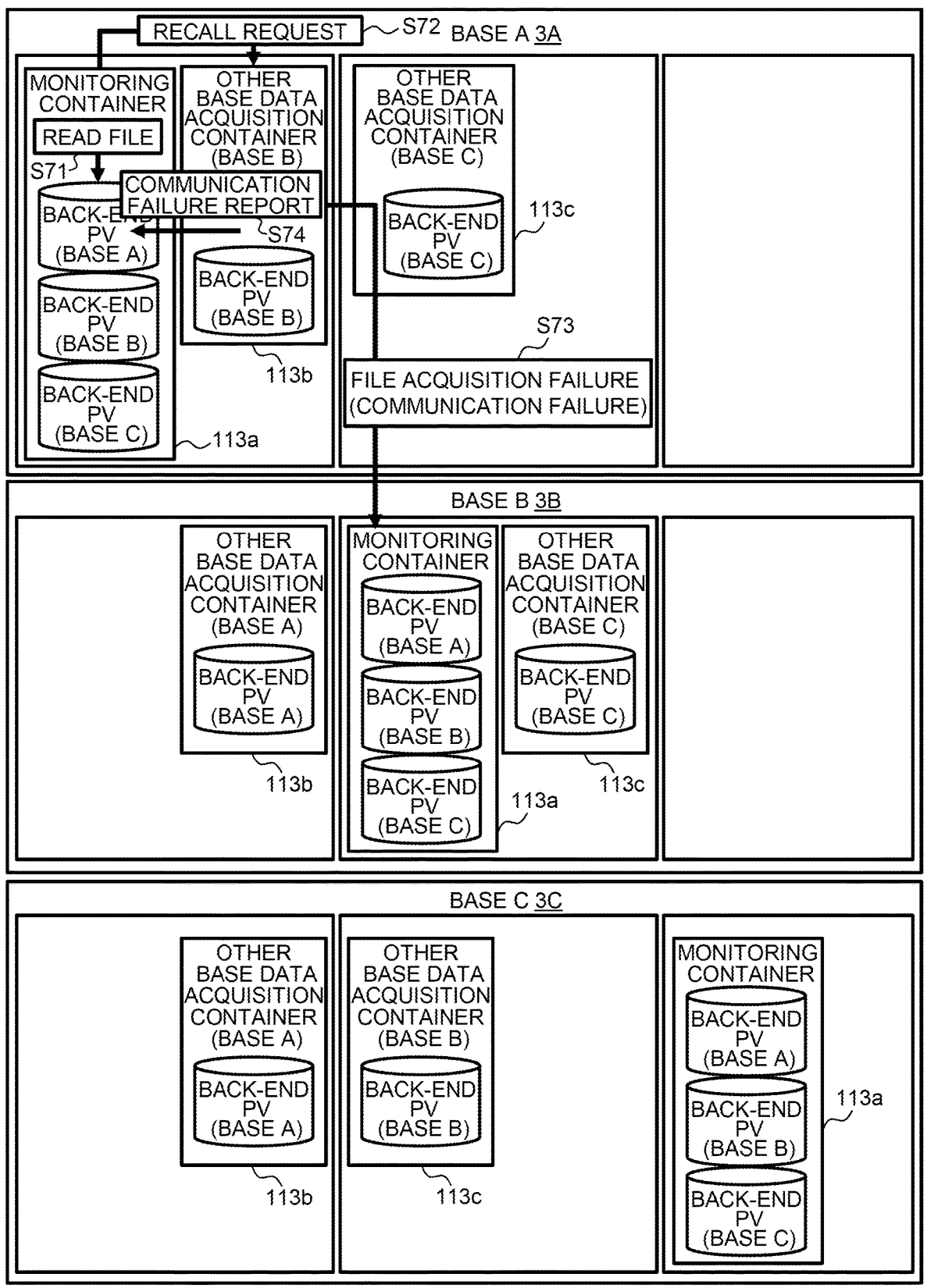
FIG. 19 is a diagram to describe a recall (in case of communication failure) of monitoring data at time of administrator authentication or the like according to the embodiment.
Figure 20:
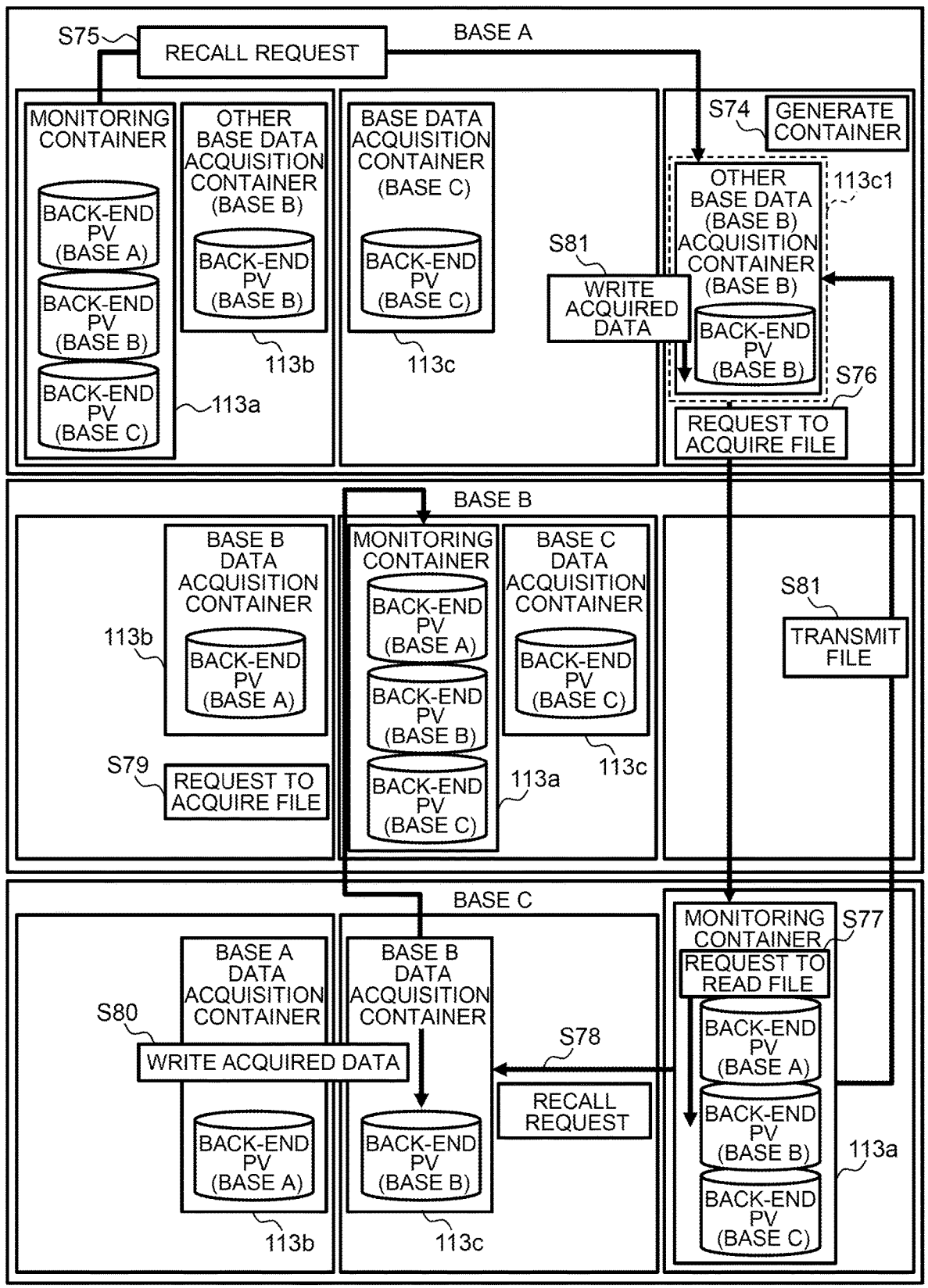
FIG. 20 is a diagram to describe a recall (in case of communication failure) of monitoring data via the other base according to the embodiment.

FIG. 19 is a diagram to describe a recall of monitoring data (in case of communication failure) at time of administrator authentication or the like according to the embodiment. FIG. 20 is a diagram to describe a recall of monitoring data (in case of communication failure) via another base according to the embodiment. In FIG. 19 and FIG. 20, an example will be described where when communication between the base A and the base B fails, the base A makes a recall to acquire a file corresponding to a stub file of the monitoring data of the base B via the base C.

First, in step S71, the monitoring container 113*a* of the base A reads the file of the monitoring data of the base B for the back-end PV (base B) mounted on itself in response to a read request. In next step S72, since the file requested to be read is a stub file, the monitoring container 113*a* of the base A requests the other base data acquisition container (base C) 113*c* to recall the file corresponding to the stub file.

In next step S73, although the other base data acquisition container (base B) 113*b* of the base A tries to acquire a file from the monitoring container 113*a* of the base C, acquisition of the file fails due to a communication failure. In next step S74, the other base data acquisition container (base B) 113*b* of the base A notifies the monitoring container 113*a* of the base A of the communication failure in step S73.

Thus, as shown in FIG. 20, in step S74, the monitoring container 113*a* of the base A generates another base data (base B) acquisition container (base C) 113*c*1 that requests the base C to acquire the file of the monitoring data of the base B. The other base data (base B) acquisition container (base C) 113*c*1 is a container on which a back-end PV of the base B is mounted.

In next step S75, the monitoring container 113*a* of the base A transmits a request to recall a file corresponding to the stub file to the other base data (base B) acquisition container (base C) 113*c*1. In next step S76, the other base data (base B) acquisition container (base C) 113*c*1 transmits a file acquisition request corresponding to the stub file to the monitoring container 113*a* of the base C.

In next step S77, the monitoring container 113*a* of the base C reads the back-end PV (base B) mounted on itself in response to the file acquisition request. If the monitoring container 113*a* of the base C has successfully read the file from the back-end PV (base B), it shifts the processing to file transmission to the other base data (base B) acquisition container (base C) 113*c*1 of the base A in step S81.

On the other hand, in step S78, if the monitoring data of the base B stored in the back-end PV (base B) mounted on itself is a stub file, the monitoring container 113*a* of the base C transmits a request to recall a file corresponding to the stub file to the other base data acquisition container (base B) 113*c* of the base C. In next step S79, the other base data acquisition container (base B) 113*c* of the base C transmits a file acquisition request to the monitoring container 113*a* of the base B in response to the request to recall the file. In next step S80, the other base data acquisition container (base B) 113*b* of the base C updates the back-end PV (base B) mounted on itself with the file of the base B acquired from the base B.

In next step S81, the monitoring container 113*a* of the base C reads the file stored in the back-end PV (base B) mounted on itself and transmits the file to the other base data (base B) acquisition container (base C) 113*c*1 of the base A. The other base data (base B) acquisition container (base C) 113*c*1 of the base A writes the file of the base B acquired from the monitoring container 113*a* of the base C to the back-end PV (base B) mounted on itself. Thus, the monitoring container 113*a* of the base A can read the file of the base B from the back-end PV mounted on itself.

Figure 21:
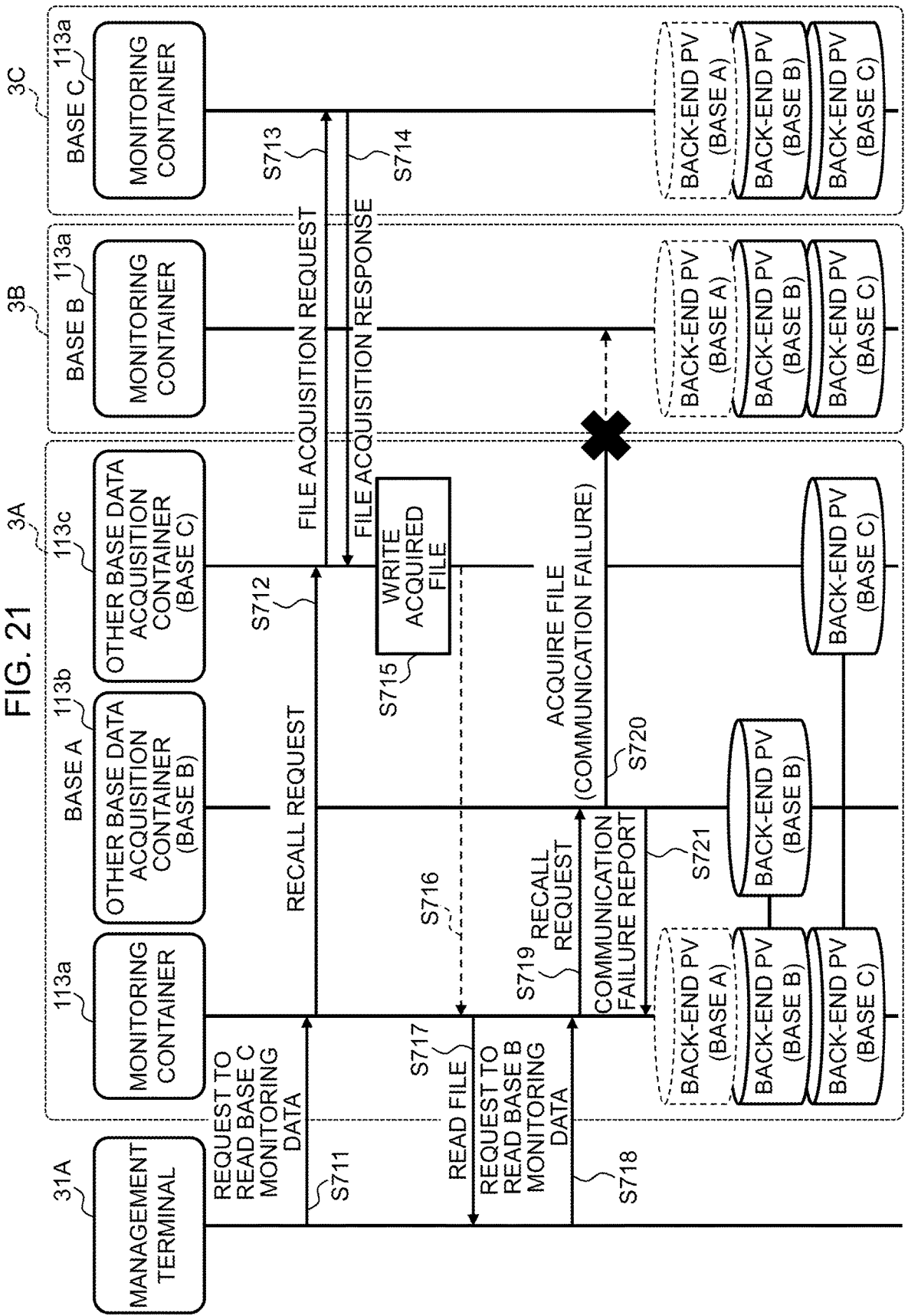
FIG. 21 is a sequence diagram illustrating a recall (in case of communication failure) of monitoring data of the other base according to the embodiment.
Figure 22:
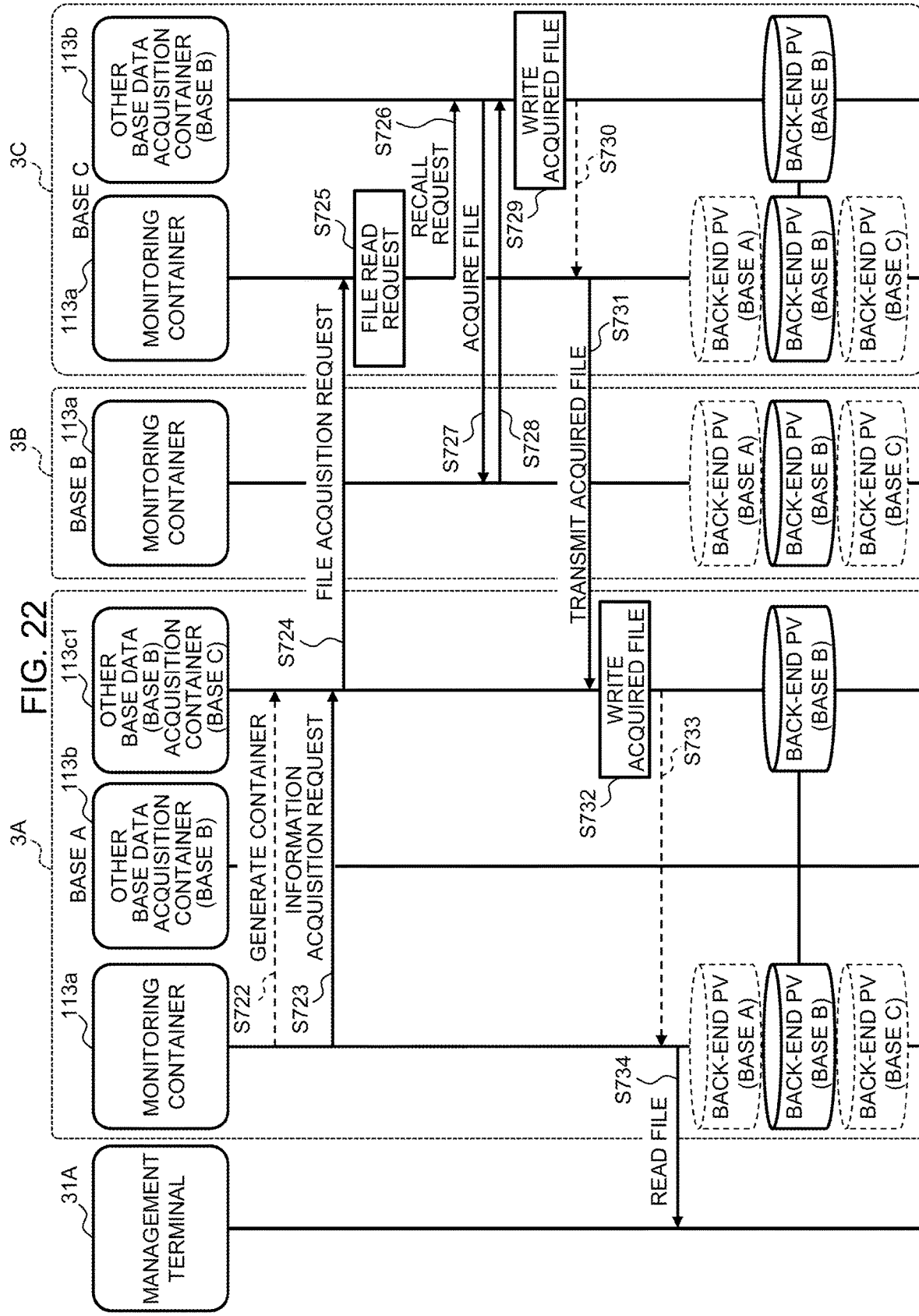
FIG. 22 is a sequence diagram illustrating a recall (in case of communication failure) of monitoring data via the other base according to the embodiment.

FIG. 21 is a sequence diagram illustrating a recall of monitoring data (in case of communication failure) of the other base according to the embodiment. FIG. 22 is a sequence diagram illustrating a recall of the monitoring data (in case of communication failure) via another base according to the embodiment. The sequence diagram in FIG. 21 corresponds to the explanatory diagram in FIG. 18 and the sequence diagram in FIG. 22 corresponds to the explanatory diagram in FIG. 19.

In FIG. 21, files corresponding to the stub files of the monitoring data of the base B and the base C are requested. An example is shown in which acquisition of the file from the base C is successful, whereas acquisition of the file from the base B fails. Note that the order in which the acquisition requests of the files of the base B and the base C are transmitted is irrelevant.

As shown in FIG. 21, in step S711, the management terminal 31A requests the monitoring container 113a of the base A to read the monitoring data of the base C. In next step S712, since the monitoring data of the base C stored in the back-end PV (base C) mounted on itself is a stub file, the monitoring container 113a of the base A requests the other base data acquisition container (base C) 113c to acquire the corresponding file.

In next step S713, the other base data acquisition container (base C) 113c of the base A requests the monitoring container 113a of the base C to acquire the file of the monitoring data of the base C. In next step S714, the monitoring container 113a of the base C transmits the file of the monitoring data of the base C to the other base data acquisition container (base C) 113c of the base A with reference to the back-end PV (base C) mounted on itself. In next step S715, the other base data acquisition container (base C) 113c of the base A writes the received file of the monitoring data of the base C to the back-end PV (base C) mounted on itself.

In step S716, the monitoring container 113a of the base A is enabled to make reference to the file of the monitoring data of the base C by referencing the back-end PV (base C) mounted on itself.

On the other hand, in step S718, the management terminal 31A requests the monitoring container 113a of the base A to read the monitoring data of the base B. In next step S719, the monitoring container 113a of the base A requests the other base data acquisition container (base B) 113b to recall the file of the monitoring data of the base B stored in the back-end PV (base B) mounted on itself. In next step S720, the other base data acquisition container (base B) 113b of the base A requests the monitoring container 113a of the base B to acquire the file of the monitoring data of the base B. However, in the file acquisition in step S720, communication between the base A and the base B fails. In step S721, the other base data acquisition container (base B) 113b of the base A notifies the monitoring container 113a of the communication failure in step S720.

Thus, as shown in FIG. 22, in step S722, the monitoring container 113a of the base A generates another base data (base B) acquisition container (base C) 113c1 on the container infrastructure on which itself is operating. In next step S723, the monitoring container 113a of the base A requests the other base data (base B) acquisition container (base C) 113c1 to acquire the file of the monitoring data of the base B. In next step S724, the other base data (base B) acquisition container (base C) 113c1 requests the monitoring container 113a of the base C to acquire the file of the monitoring data of the base B.

In next step S725, the monitoring container 113a of the base C requests a read of the file of the back-end PV (base B) mounted on itself. In step S725, when the file of the back-end PV (base B) mounted on itself is not a stub file, the monitoring container 113a of the base C shifts the processing to step S731. In step S731, the monitoring container 113a of the base C transmits the read file to the other base data (base B) acquisition container (base C) of the base A.

In contrast, in step S725, when the file of the back-end PV (base B) mounted on itself is a stub file, the monitoring container 113a of the base C shifts the processing to step S726. In step S726, the monitoring container 113a of the base C requests the other base data acquisition container (base B) 113b of the base C to recall the monitoring data of the base B.

In next step S727, the other base data acquisition container (base B) 113b of the base C requests the monitoring container 113a of the base B to acquire the file of the monitoring data of the base B. In next step S728, the monitoring container 113a of the base B transmits the file of the monitoring data of the base B to the other base data acquisition container (base B) 113b of the base C.

In next step S729, the other base data acquisition container (base B) 113b of the base C updates the back-end PV (base B) mounted on itself with the file of the monitoring data of the base B acquired from the monitoring container 113a of the base B. In step S730, the monitoring container 113a of the base C is enabled to make reference to the file of the monitoring data of the base B by referencing the back-end PV (base B) mounted on itself.

In next step S731, the monitoring container 113a of the base C transmits the file of the monitoring data of the base B to the other base data (base B) acquisition container (base C) 113c1 of the base A with reference to the back-end PV (base B) mounted on itself.

In next step S732, the other base data (base B) acquisition container (base C) 113c1 of the base A writes the file of the monitoring data of the base B received from the monitoring container 113a of the base C to the back-end PV (base B) mounted on itself. In step S733, the monitoring container 113a of the base A is enabled to make reference to the file of the monitoring data of the base B by referencing the back-end PV (base B) mounted on itself.

In next step S734, the monitoring container 113a of the base A reads the file and responds to the read request from the management terminal 31A with reference to the back-end PV (base B) mounted on itself.

Effects of Embodiment

According to the above-described embodiment, when operating a plurality of dHCI systems at each base, the system makes monitoring data sharable among the bases and makes it possible to acquire the target monitoring data, file, directory information via different other bases in the event of a temporary network malfunction among certain bases. Thus, it is possible to provide a data sharing system with high fault resistance capable of reducing the management cost of the dHCI systems and continuing data sharing irrespective of a temporal communication failure among the certain bases. Furthermore, user data can also be shared among the plurality of dHCI systems in the same way as the monitoring data, and so it is possible to reduce the management cost of the dHCI systems and improve operational convenience.

Other Embodiments

A data sharing program to implement the data sharing system 1 of the above-described embodiment can be installed from a computer-readable non-transitory storage medium in a plurality of computers to constitute each dHCI system 100. That is, the data sharing program causes each computer to function as a plurality of computer systems (dHCI systems 100) configured to include a physical computer (dHCI 110) that provides a virtual environment to execute an application and a storage system 120 that provides a volume together with a storage device 111 (FIG. 2) of the physical computer to the virtual environment, each computer system of the data sharing system 1 sharing data by communication. The data sharing program causes each computer to execute a first procedure to store data of the own computer system in the volume of the own computer system and a second procedure to acquire data of another computer system and store the data from the other computer system in the volume. When data of some other computer system cannot be acquired from the other computer system, the second procedure includes a third procedure to acquire the data from another different computer system and store the data in the volume.

It is also possible to implement a data sharing method carried out by a plurality of computer systems (dHCI systems 100) configured to include a physical computer (dHCI 110) that provides a virtual environment to execute an application and a storage system 120 that provides a volume together with a storage device 111 (FIG. 2) of the physical computer to the virtual environment, each computer system of the data sharing system 1 sharing data by communication. The data sharing method includes a first step in which each of the plurality of computer systems stores data of each own computer system in a volume of the own computer system and a second step in which each of the plurality of computer systems acquires the data of the other computer system from the other computer system and stores the data in the volume. The second step includes a third step in which, when each of the plurality of computer systems cannot acquire data of some other computer system from the other computer system, data is acquired from a different other computer system and the data is stored in the volume.

Although the present disclosure has been described with reference to example embodiments, those skilled in the art will recognize that various changes and modifications may be made in form and detail without departing from the spirit and scope of the claimed subject matter. For example, the above-described embodiments have been described in detail to describe the present invention in an easily understandable manner, and so the present invention is not necessarily limited to embodiments including all the described components. Some components of a certain embodiment may be substituted by components of another embodiment or components of another embodiment may be added to components of a certain embodiment as long as there is no contradiction. Components may be added, deleted, substituted, integrated or distributed to/from some components of each embodiment. The components and processing presented in the embodiments may be distributed, integrated or substituted based on processing efficiency or mounting efficiency as appropriate.

What is claimed is:

1. A data sharing system in which a plurality of computer systems share data by communication, each computer system comprising:
   a physical computer that provides a virtual environment to execute an application; and
   a storage system that provides a volume to the virtual environment together with a storage device of the physical computer,
   wherein each of the plurality of computer systems stores data of an own computer system in the volume of an own computer system, acquires data of another computer system from the other computer system and stores the data in the volume, and when data of the other computer system cannot be acquired from the other computer system, the data of the other computer system is acquired from a different computer system than the other computer system and the data of the other computer system is stored in the volume,
   wherein each of the plurality of computer systems operates a monitoring container that acquires own monitoring data, which is a monitoring result of an operating situation of the own computer system, and another computer data acquisition container that acquires other monitoring data, which is a monitoring result of the operating situation of the other computer system, from the other computer system, and
   wherein the other computer data acquisition container mounts the volume provided for each of the other computer systems, which are other monitoring data acquisition destinations, to store the other monitoring data.

2. The data sharing system according to claim 1, wherein the monitoring container mounts the volume that stores the own monitoring data, and generates, when some other computer data acquisition container cannot acquire the other monitoring data of some other computer system from some other computer system, a different other computer data acquisition container that acquires the other monitoring data from the different computer system, and
wherein the different other computer data acquisition container acquires the other monitoring data from the different computer system and stores the other monitoring data in the volume.

3. The data sharing system according to claim 2, wherein each monitoring container of the plurality of computer systems acquires file, directory information of the other monitoring data from the other computer system at a given opportunity by the other computer data acquisition container and generates or updates a stub file of the other monitoring data based on the file, directory information.

4. The data sharing system according to claim 2, wherein when some other computer data acquisition container cannot acquire file, directory information of the other monitoring data of some other computer system from the other computer system, the monitoring container generates a different other computer data acquisition container that acquires the file, directory information from the different computer system, and
the different other computer data acquisition container acquires the file, directory information from the different computer system and updates the volume.

5. The data sharing system according to claim 2, wherein each monitoring container of the plurality of computer systems converts the other monitoring data retained in the volume for each other computer system to a stub file upon fulfillment of conditions.

6. The data sharing system according to claim 5, wherein when a read request for the other monitoring data retained in the volume for each of the other computer systems is received, if the other monitoring data is converted to a stub file, each monitoring container of the plurality of computer systems transmits a request to recall the other monitoring data to the other computer data acquisition container, and
upon receiving the recall request, the other computer data acquisition container requests the other computer system to acquire the other monitoring data.

7. The data sharing system according to claim 2, wherein each monitoring container of the plurality of computer systems manages a combination of the other computer data acquisition container, the other computer system as a communication destination of the other computer data acquisition container and the other computer system as an acquisition destination of the other monitoring data acquired by the other computer data acquisition container, and determines the other computer data acquisition container that acquires the other monitoring data based on the combination.

8. The data sharing system according to claim 7, wherein each monitoring container of the plurality of computer systems manages priority of the combination, and determines the other computer data acquisition container that acquires the other monitoring data based on the priority and availability of communication with the other computer system as the communication destination.

9. The data sharing system according to claim 2, wherein the different other computer data acquisition container is stopped after a certain period of time elapses after the generation.

10. The data sharing system according to claim 1, wherein the monitoring container mounts the volume that stores the own monitoring data, and generates, when some other computer data acquisition container cannot acquire the other monitoring data of some other computer system from some other computer system, a different other computer data acquisition container that acquires the other monitoring data from the different computer system.

11. The data sharing system according to claim 10, wherein the different other computer data acquisition container acquires the other monitoring data from the different computer system.

12. A data sharing method carried out by a data sharing system in which a plurality of computer systems share data by communication, each computer system comprising:

a physical computer that provides a virtual environment to execute an application; and a storage system that provides a volume to the virtual environment together with a storage device of the physical computer, the method comprising:

a first step in which each of the plurality of computer systems stores data of an own computer system in the volume of an own computer system; and a second step in which each of the plurality of computer systems acquires data of another computer system from the other computer system and stores the data in the volume, wherein the second step comprises a third step in which, when each of the plurality of computer systems cannot acquire the data of the other computer system from the other computer system, the data of the other computer system is acquired from a different computer system than the other computer system and the data of the other computer system is stored in the volume, wherein each of the plurality of computer systems operates a monitoring container that acquires own monitoring data, which is a monitoring result of an operating situation of the own computer system, and another computer data acquisition container that acquires other monitoring data, which is a monitoring result of the operating situation of the other computer system, from the other computer system, and wherein the other computer data acquisition container mounts the volume provided for each of the other computer systems, which are other monitoring data acquisition destinations, to store the other monitoring data.

13. A non-transitory computer-readable recording medium for a data sharing program to cause each computer to function as each computer system of a data sharing system in which a plurality of computer systems share data by communication, each computer system comprising:

a physical computer that provides a virtual environment to execute an application; and a storage system that provides a volume to the virtual environment together with a storage device of the physical computer, the data sharing program causing each computer to execute:

a first procedure to store data of an own computer system in the volume of an own computer system; and a second procedure to acquire data of another computer system from the other computer system and store the data in the volume, wherein, when the data of the other computer system cannot be acquired from the other computer system, the second procedure comprises a third procedure to acquire the data of the other computer system from a different computer system than the other computer system and stores the data of the other computer system in the volume, wherein each of the plurality of computer systems operates a monitoring container that acquires own monitoring data, which is a monitoring result of an operating situation of the own computer system, and another computer data acquisition container that acquires other monitoring data, which is a monitoring result of the operating situation of the other computer system, from the other computer system, and wherein the other computer data acquisition container mounts the volume provided for each of the other computer systems, which are other monitoring data acquisition destinations, to store the other monitoring data.

* * * * *